United States Patent
Castro Castro

(10) Patent No.: US 9,735,971 B2
(45) Date of Patent: Aug. 15, 2017

(54) HIGH-AVAILABILITY, SCALABLE POLICY AND CHARGING CONTROL SYSTEMS, AND METHODS THEREFOR

(71) Applicant: Telefonaktiebolaget L M Ericsson (publ), Stockholm (SE)

(72) Inventor: Fabian Castro Castro, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 14/428,055

(22) PCT Filed: Sep. 17, 2012

(86) PCT No.: PCT/EP2012/068220
§ 371 (c)(1),
(2) Date: Mar. 13, 2015

(87) PCT Pub. No.: WO2014/040652
PCT Pub. Date: Mar. 20, 2014

(65) Prior Publication Data
US 2015/0236863 A1    Aug. 20, 2015

(51) Int. Cl.
*H04L 12/16* (2006.01)
*H04L 12/14* (2006.01)

(52) U.S. Cl.
CPC .............................. *H04L 12/1407* (2013.01)

(58) Field of Classification Search
None
See application file for complete search history.

(56) References Cited

U.S. PATENT DOCUMENTS

2008/0046963 A1* 2/2008 Grayson ................. H04L 12/66
726/1
2008/0052258 A1* 2/2008 Wang .................... H04L 63/102
706/46

(Continued)

FOREIGN PATENT DOCUMENTS

WO    WO 2011/107813    9/2011

OTHER PUBLICATIONS

PCT Notification of Transmittal of the International Search Report and the Written Opinion of the International Searching Authority, or the Declaration for International application No. PCT/EP2012/068220, Jul. 15, 2013.

(Continued)

*Primary Examiner* — Phirin Sam

(74) *Attorney, Agent, or Firm* — Baker Botts, LLP

(57) ABSTRACT

In a method carried out by a first and second policy and charging rules functions (PCRF) (201, 202), the first PCRF receives (s10), from a policy and charging enforcement function (PCEF) (100), an IP-CAN session establishment indication, determines (s20) first policy decision information, causes (s30) a database (300) accessible by both PCRFs to store, in association with a session identifier, session information comprising the session data and the first policy decision information; and provides (s40), to the PCEF, the first policy decision information. Later, the second PCRF receives (s50), from the PCEF, a session modification indication, obtains (s60) therefrom the session identifier, retrieves (s70), from the database, the session information, determines (s80) second policy decision information; causes (s90) the database to store session information comprising the modified session data and second policy decision information; and provides (s100), to the PCEF, the second policy decision information. The invention also relates to a system putting into practice such method.

14 Claims, 13 Drawing Sheets

(56) References Cited

U.S. PATENT DOCUMENTS

| | | | | |
|---|---|---|---|---|
| 2011/0302289 A1* | 12/2011 | Shaikh | ............... | H04L 29/12216 709/223 |
| 2012/0005358 A1* | 1/2012 | Siddam | ............... | H04L 12/1407 709/230 |
| 2012/0117251 A1* | 5/2012 | Zhou | ................ | H04W 76/022 709/227 |
| 2013/0166746 A1* | 6/2013 | Andreasen | .......... | H04L 41/0893 709/225 |
| 2013/0326034 A1* | 12/2013 | Shaik | ................ | H04L 12/243 709/223 |
| 2014/0105223 A1* | 4/2014 | Castellanos Zamora | ................ | H04L 47/724 370/458 |

OTHER PUBLICATIONS

3GPP TS 23.203 V11.7.0 (Sep. 2012) 3rd Generation Partnership Project; Technical Specification Group Services and System Aspects; Policy and charging control architecture (Release 11), 2012.

3GPP TR 29.816 V10.0.0 (Sep. 2010) 3rd Generation Partnership Project; Technical Specification Group Core Network and Terminals; Study on PCRF failure and restoration (Release 10), 2010.

\* cited by examiner

HIGH-AVAILABILITY, SCALABLE POLICY AND CHARGING CONTROL SYSTEMS, AND METHODS THEREFOR

PRIORITY

This nonprovisional application is a U.S. National Stage Filing under 35 U.S.C. §371 of International Patent Application Serial No. PCT/EP2012/068220, filed Sep. 17, 2012, and entitled "HIGH-AVAILABILITY, SCALABLE POLICY AND CHARGING CONTROL SYSTEMS".

TECHNICAL FIELD

The present invention relates to methods carried out in a telecommunication network involving network nodes of a policy and charging control (PCC) architecture. The invention also relates to systems involving network nodes in a PCC architecture.

BACKGROUND

In communication networks, such as telecommunication networks, a call or a service often involves, on the one hand, a control plane or signalling plane and, on the other hand, a user plane or media plane. The control plane or signalling plane is concerned with connection management. The user plane or media plane is mainly in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber, i.e. the user, is entitled, or authorized, to enjoy a service, and whether the network can provide the service to the subscriber (and, possibly, with which quality of service).

Policy and charging control (PCC) architectures, such as, but not limited to, the architecture described in "3*GPP TS* 23.203 V11.6.0 (2012-06); *Technical Specification; 3rd Generation Partnership Project; Technical Specification Group Services and System Aspects; Policy and charging control architecture (Release* 11)" (available on http://www.3gpp.org/ftp/Specs/html-info23203.htm) (hereinafter referred to as "reference [1]"), integrate the policy and charging control.

In such a PCC architecture, the policy and charging rules function (PCRF) is a functional entity in charge of deciding charging, policies and quality of service (QoS) for services of a given user. The PCRF may for example decide the quality of the connection to be allocated for voice, video, etc., which results, for example, on the establishment of dedicated bearer(s) with guaranteed bit rate (GBR) or non-guaranteed bit rate (non GBR). The PCRF may also make decisions about packet forwarding treatment in the radio access network (RAN) by means of determining the QoS class identifier (QCI). The PCRF may also decide, at the packet core control plane, the priority of a bearer to be established over other bearers, for the same or different users. Based on the above decisions by the PCRF, PCC rules may be generated and then installed in a policy and charging enforcement function (PCEF) of the PCC architecture, so that each service is given the appropriate treatment that the service requires. Installing PCC rules from the PCRF in the PCEF may include the PCRF generating the PCC rules, downloading and activating said PCC rules to the PCEF, or may include activating, from the PCRF, indicated PCC rules configured in the PCEF.

The background further includes the following documents.

3GPP TR 29.816 V10.0.0 (2010-09), "*Technical Report; 3rd Generation Partnership Project; Technical Specification Group Core Network and Terminals; Study on PCRF failure and restoration (Release* 10)", hereinafter referred to as reference [2], contains the results of a study on PCRF failure and restoration, with a discussion of various scenarios (clause 4), functional requirements for solutions (clause 5), and different solutions (clause 6).

3GPP TS 23.335 V10.0.0 (2011-03), "Technical Specification, 3rd Generation Partnership Project; Technical Specification Group Core Network and Terminals; User Data Convergence (UDC); Technical realization and information flows; Stage 2 (Release 10)", hereinafter referred to as reference [3], relates to procedures and signalling flows associated with a user data convergence (UDC) concept supporting a layered architecture separating the data from the application logic in a telecommunication system. In particular, user data may be stored in a logically unique repository allowing access from core and service layer entities.

WO 2011107813 A1, hereinafter referred to as reference [4], relates to handling redundancy of a PCRF in a wireless communication network having an active PCRF, a standby PCRF and a PCEF by replicating accumulative quota usage of the active PCRF in a memory of the standby PCRF every time an update request is received at the active PCRF.

WO 2012095697 A1, hereinafter referred to as reference [5], relates to a PCC architecture with an autonomous PCRF redundancy, in which a standby PCRF may replace a formerly active PCRF by obtaining from each PCRF client the dynamic data currently applying to existing IP-CAN sessions.

It is desirable to provide methods and apparatuses to improve PCC architectures and implementations, notably by providing efficient failover mechanisms as well as scalable architectures, without increasing, or at least without excessively increasing, the implementation and architecture complexity and the associated equipment costs.

SUMMARY

To meet or at least partially meet the above-mentioned goals, methods and systems according to the invention are defined in the independent claims. Particular embodiments are defined in the dependent claims.

In one embodiment, a method is carried out by at least a first PCRF and a second PCRF. The first PCRF receives, from a PCEF, a first message indicating an establishment of an Internet Protocol (IP) connectivity access network session (IP-CAN session), wherein the first message comprises IP-CAN session data. The first PCRF then determines first policy decision information for the IP-CAN session. The first PCRF then causes a database accessible by both the first PCRF and the second PCRF to store, in association with a session identifier, session information comprising, or representing, the IP-CAN session data and the first policy decision information. The first PCRF then provides, to the PCEF, the first policy decision information. The second PCRF receives, from the PCEF or from another PCRF client such as for example a traffic detection function (TDF), an online charging system (OCS), a bearer binding and event reporting function (BBERF), or an application function (AF), a second message indicating a modification of the IP-CAN session, wherein the second message comprises modified IP-CAN session data. The second PCRF then obtains or derives, from the second message, the session identifier of the IP-CAN session. The second PCRF then retrieves, from the database, the session information stored in association with the session identifier.

The second PCRF then determines second policy decision information for the IP-CAN session based on the modified IP-CAN session data and the retrieved session information. The second PCRF then causes the database to store, in association with the session identifier, session information comprising, or representing, the modified IP-CAN session data and the second policy decision information. The second PCRF then provides, to the PCEF and/or to the other PCRF client from which the IP-CAN session modification indication originated, the second policy decision information.

The method therefore provides procedures enabling efficient failover in a scalable PCC architecture. In particular, if the event of a failure of a first PCRF, a second PCRF may take over on-going IP-CAN sessions without loss of data. In other words, a user plane session can survive despite the failure of the PCRF originally handling the session. Further, the method lends itself well to the addition of further PCRFs to provide redundancy, to cope with load increases (i.e., increases in the number of requests to be handled by the PCRF(s)), and to cope with the use of load balancing to share the load among to the PCRFs.

The above-described steps need not necessarily be carried out in the above-mentioned order. In particular, the step of causing, by the first PCRF, the database to store session information comprising, or representing, the IP-CAN session data and the first policy decision information and the step of providing, by the first PCRF, to the PCEF, the first policy decision information may be performed in any order (i.e., "causing" then "providing", or "providing" then "causing") or in parallel (i.e., concurrently). Likewise, the step of causing, by the second PCRF, the database to store session information comprising, or representing, the modified IP-CAN session data and the second policy decision information and the step of providing, by the second PCRF, to the PCEF—and/or to the other PCRF client from which the IP-CAN session modification indication originated—, the second policy decision information may be performed in any order (i.e., "causing" then "providing", or "providing" then "causing") or in parallel (i.e., concurrently).

In one embodiment, the first policy decision information comprises first PCC rules and the second policy decision information comprises second PCC rules. The policy decision information determined by, or generated by, the PCRF, and to be installed in the PCEF—and/or to be installed on, or used by, another PCRF client—, are however not limited to PCC rules. The policy decision information may comprise any one of PCC rules, event triggers, charging related information, authorized QoS, event report indication, usage monitoring information, ADC rules, etc., or a combination of different types of policy decision information.

In one embodiment, the method further comprises, by the first PCRF or second PCRF: receiving, from the PCEF, a third message indicating a termination of the IP-CAN session; obtaining or deriving from the third message the session identifier of the IP-CAN session; and terminating the IP-CAN session based on the session information stored, in association with the session identifier, in the database.

An IP-CAN session termination may also be handled by a third PCRF rather than by the first or second PCRF. Namely, in one embodiment, the method is further carried out by a third PCRF, which has also access to the above-mentioned database storing the PCRF session information. Upon receiving, from the PCEF, a third message indicating termination of the IP-CAN session, the third PCRF obtains or derives, from the third message, the session identifier of the IP-CAN session, and the third PCRF then terminates the IP-CAN session based on the session information stored, in association with the session identifier, in the database.

In one embodiment, the first PCRF is hosted on a first network node, the second PCRF is hosted on a second network node, and the database is hosted on a third network node, wherein each of the first network node, the second network node and the third network node has its own processing unit, its own volatile memory, its own networking capabilities and its own non-volatile storage.

For example, each of the first network node and the second network node may be implemented as one or more blades of a blade system. The database may as well be implemented as one or more blades of a blade system.

A blade system is here understood as a computer system having a blade cluster structure. A blade cluster structure is made of an enclosure (or chassis) including a plurality of servers or blades (also called cards or boards) in a dense configuration (for example 16, 32, 64 or 128 blades in one enclosure). A blade is typically made up of a processor (processing unit), a volatile memory, networking capabilities and a non-volatile storage (e.g. flash memory or small hard disk). The blade cluster structure's enclosure provides the bulky elements and services such as power supply and cooling. Although a blade comprises more than just a processing unit, a blade may also here be referred to as a processing unit, for the sake of simplicity. The terms are used interchangeably, although in reality a blade comprises more elements than just a processing unit.

A blade cluster structure provides flexibility (a blade is usually designed to be easily removed, possibly in runtime, from the blade cluster structure or added to the blade cluster structure without interfering with the other blades), space saving (the blade cluster structure's enclosure provides the bulky hardware elements) and improves manageability (a blade can operate independently).

Implementing the first network node, the second network node and the database in a blade system constitutes an exemplary embodiment. In another embodiment, the database may be, alternatively or additionally, implemented as a distributed database system comprising a plurality of database nodes.

In one embodiment, the database storing the PCRF session information is hosted on a network node which also hosts a subscription profile repository (SPR). A SPR is a logical entity containing all subscriber/subscription related information needed for subscription-based policies and IP-CAN bearer level PCC rules needed by the PCRF.

In another embodiment, the database storing the PCRF session information is hosted on a network node which does not host a SPR. In other words, the database storing the PCRF session information, and the SPR, storing the subscriber/subscription related information, are hosted on separate network nodes.

The invention also relates to systems of network nodes, implemented for example as programmed computers or sets of programmed computers.

In one embodiment, a system comprises a first network node hosting a first PCRF, and a second network node hosting a second PCRF. In this embodiment, the system is configured so that, when the first network node receives, from a network node hosting a PCEF, a first message indicating an IP-CAN session establishment, wherein the first message comprises IP-CAN session data, the first network node determines first policy decision information (such as first PCC rules, etc. as mentioned above) for the IP-CAN session, the first network node causes a database accessible by the first network node and second network node to store, in association with a session identifier, session information comprising, or representing, the IF-CAN session data and the first policy decision information, and the first network node provides, to the network node hosting the PCEF, the first policy decision information. The system is further configured so that, when the second network node receives, from the network node hosting the PCEF—or from a network node hosting another PCRF client such as for example a TDF, an OCS, a BBERF, or an AF—, a second message indicating a modification of the IP-CAN session, the second message comprising modified IP-CAN session data, the second network node obtains or derives, from the second message, the session identifier of the IP-CAN session, the second network node retrieves, from the database, the session information stored in association with the session identifier, the second network node determines second policy decision information for the IP-CAN session based on the modified IP-CAN session data and the retrieved session information, the second network node causes the database to store, in association with the session identifier, session information comprising, or representing, the modified IP-CAN session data and the second policy decision information, and the second network node provides, to the network node hosting the PCEF—and/or to the network node hosting the other PCRF client from which the IP-CAN session modification indication originated—, the second policy decision information.

The invention also relates to computer program products and computer programs comprising computer-executable instructions configured, when executed on the network nodes, to cause the network nodes to participate in a method according to any one of the above-described embodiments, or to implement the functions of a network node of a system according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
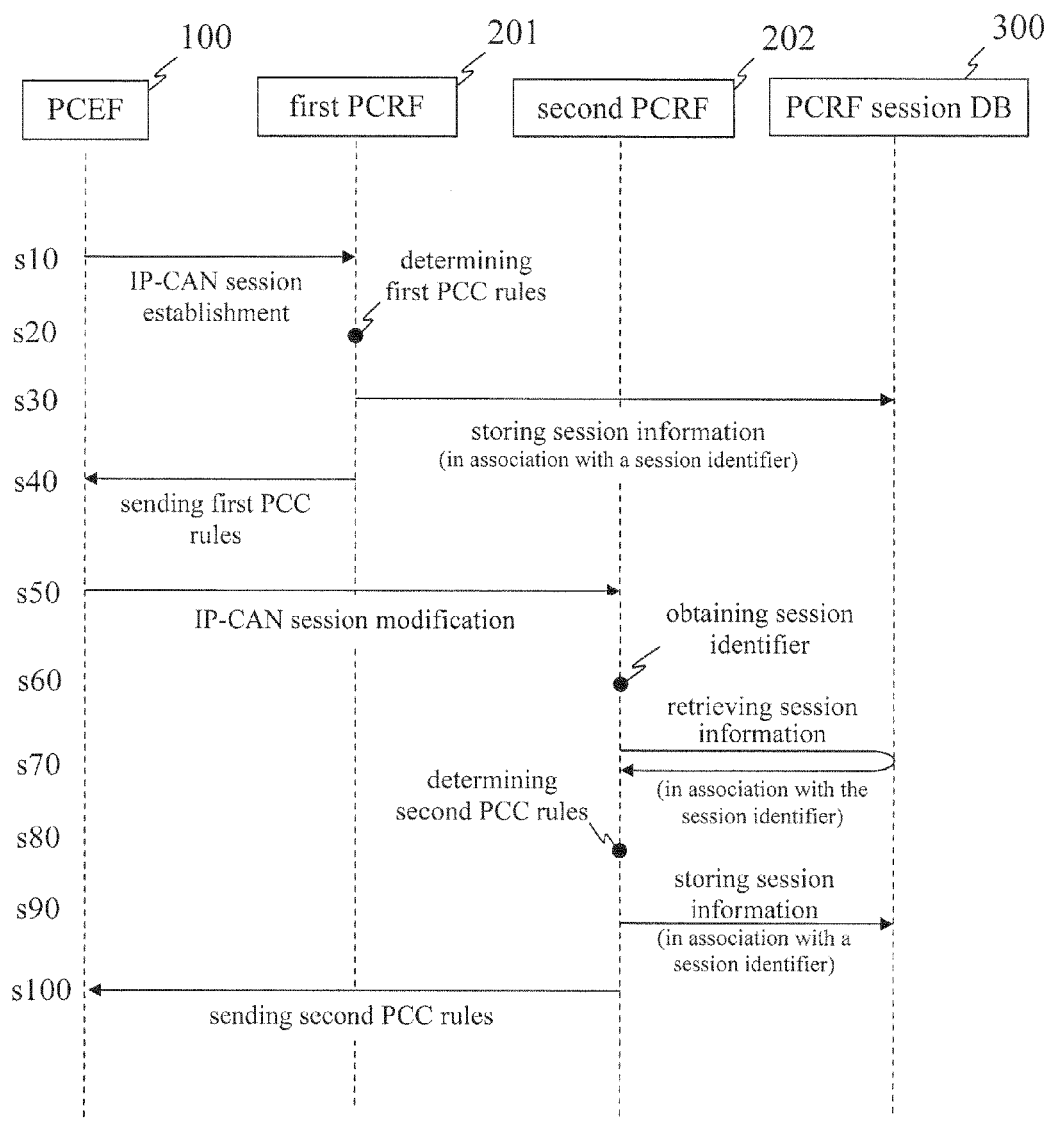
FIG. 1 is a message sequence chart of a method in one embodiment of the invention.

FIG. 1 is a message sequence chart illustrating the exchange of messages between entities in a method in one embodiment of the invention. The method involves a PCEF 100, a first PCRF 201, a second PCRF 202, and a PCRF session database (DB) 300. PCRF session DB 300 is accessible by first PCRF 201 and second PCRF 202.

The method illustrated in FIG. 1 involves the following steps.

In step s10 (as illustrated by the arrow labelled "IP-CAN session establishment"), an IP-CAN session establishment indication is received by first PCRF 201 from PCEF 100. Reference [1], subclause 7.2 (entitled "IP-CAN Session Establishment"), illustrates an exemplary signalling flow for an IP-CAN session establishment. "3*GPP TS* 29.213 *V*11.3.0 (2012-06), *Technical Specification, 3rd Generation Partnership Project; Technical Specification Group Core Network and Terminals; Policy and Charging Control signalling flows and Quality of Service (QoS) parameter mapping (Release* 11)", hereinafter referred to as reference [6], also illustrates, in its subclause 4.1 (entitled "IP-CAN Session Establishment"), another exemplary signalling flow for an IP-CAN session establishment. PCEF 100, when sending the IP-CAN session establishment indication to first PCRF 201, requests PCC rules to be decided by first PCRF 201 for the IP-CAN session. The IP-CAN session establishment indication may be in the form of a message which may comprise IP-CAN session data with for example: a user equipment (UE) identity or user identification, the type of the radio access technology, a packet data network (PDN)

identifier (e.g. APN), an IP-CAN type and a IPv4 address and IPv6 network prefix (see also for example reference [1], page 83, item 3; reference [6], page 14, item 3; as well as "3GPP TS 29.212 V11.5.0 (2012-06), *Technical Specification, 3rd Generation Partnership Project; Technical Specification Group Core Network and Terminals; Policy and Charging Control (PCC) over Gx/Sd reference point (Release 11)*", hereinafter referred to as reference [7], subclause 4.5.1, entitled "Request for PCC rules", paragraph starting with "1) At IP-CAN session establishment:").

The message is a set of bits which can be transmitted over a communication network. The message may also be transmitted through a series of packets.

In step s20 (as illustrated by the dot labelled "determining first PCC rules"), first PCRF 201 determines first PCC rules for the IP-CAN session, based on the IP-CAN session data (received from PCEF 100 in step s10) and based on configuration information stored in PCRF 201 or at least accessible by PCRF 201.

In step s30 (as illustrated by the arrow labelled "storing session information (in association with a session identifier)"), PCRF 201 causes database 300 to store, in association with a session identifier, session information comprising, or representing, the IP-CAN session data (received from PCEF 100 in step s10) and the first PCC rules (decided in step s20).

In step s40 (as illustrated by the arrow labelled "sending first PCC rules"), PCRF 201 provides the first PCC rules (decided in step s20) to PCEF 100. Step s40 may also be performed before, or in parallel to, step s30. If step s40 is performed before step s30, appropriate and conventional mechanisms should be used in order to solve or prevent concurrent accesses and to avoid inconsistencies in retrieving data from database 300 (in particular, to make sure that the most up-to-date information is already stored in database 300 before processing a request for the same IP-CAN session from another PCRF client).

Then, in step s50 (as illustrated by the arrow labelled "IP-CAN session modification"), an IP-CAN session modification indication is received by second PCRF 202 from PCEF 100. As mentioned above, the IP-CAN session modification indication may also be received from another PCRF client (not illustrated on FIG. 1). Reference [1], subclause 7.4 (entitled "IP CAN Session Modification"), illustrates an exemplary signalling flow for an IP-CAN session modification. Reference [6], subclause 4.3.2 (entitled "PCEF-Initiated IP-CAN Session Modification (PCC Rule Provisioning in PULL Mode)") illustrates other exemplary signalling flows for an IP-CAN session modification initiated by a PCEF. PCEF 100, when sending the IP-CAN session modification indication to second PCRF 202, requests PCC rules to be adapted by second PCRF 202 for the IP-CAN session. The IP-CAN session modification indication may be in the form of a message which may comprise modified IP-CAN session data with for example: an event report, and an indication of the affected PCC rules (see also for example reference [1], page 90, item 5, as well as reference [7], subclause 4.5.1 entitled "*Request for PCC rules*", paragraph starting with "2) At IP-CAN session modification:").

The IP-CAN session modification indication is received by second PCRF 202 rather than by first PCRF 201 for example because a failure of first PCRF 201 occurred or because an intermediate load balancer (not illustrated on FIG. 1), located between PCEF 100 and first and second PCRFs 201, 202, has directed the PCEF request towards second PCRF 202 rather than towards first PCRF 201.

Although not illustrated on FIG. 1, the IP-CAN session modification indication may alternatively be received by second PCRF 202 from another PCRF client (or PCRF neighbour peer) such as for example an AF, a TDF, an OCS, or an BBERF (see for example reference [1], subclause 7.4.1 regarding the session modification procedures, and subclause 7.4.2 regarding the IP-CAN session modification initiated from the AF, TDF and OCS; as well as reference [6], subclause 4.3.1 (entitled "Network-Initiated IP-CAN Session Modification"), which illustrates further exemplary signalling flows for an IP-CAN session modification initiated from an AF, TDF or OCS).

In step s60 (as illustrated by the dot labelled "obtaining session identifier"), PCRF 202 obtains or derives, from the IP-CAN session modification indication received from PCEF 100, the session identifier of the IP-CAN session.

In step s70 (as illustrated by the arrow labelled "retrieving session information (in association with the session identifier)"), PCRF 202 retrieves, from database 300, the session information stored in association with the session identifier (obtained or derived in step s60).

In step s80 (as illustrated by the dot labelled "determining second PCC rules"), PCRF 202 then determines (or decides) second PCC rules for the IP-CAN session based on the modified IP-CAN session data (received in step s50) and the session information (retrieved from database 300 in step s70).

In step s90 (as illustrated by the arrow labelled "storing session information (in association with a session identifier)"), PCRF 202 then causes database 300 to store, in association with the session identifier (obtained or derived in step s60), session information comprising, or representing, the modified IP-CAN session data (received in step s50) and the second PCC rules (determined in step s80).

In step s100 (as illustrated by the arrow labelled "sending second PCC rules"), PCRF 202 provides, to PCEF 100 (and/or to the other PCRF client from which the IP-CAN session modification indication originated), the second PCC rules. Step s100 may alternatively be performed before, or in parallel to, step s90. If step s90 is performed before step s100, appropriate and conventional mechanisms should be used to solve or prevent concurrent accesses and to avoid inconsistencies in retrieving data from database 300 (in particular, as mentioned above, to make sure that the most up-to-date information is stored in database 300 before processing a request for the same IP-CAN session from another PCRF client).

This therefore provides a flexible, resilient and scalable PCC architecture. The architecture involves a plurality of PCRF entities. Each of the PCRF entities acts as a stateless front end handling the logic and processes of a PCRF, whereas the session information is stored in, and retrieved from, a common database shared by the plurality of PCRFs.

Although FIG. 1 schematically illustrates four entities, more entities may be involved. For example, there may be more than one PCEF, there may be more than two PCRFs (as illustrated on any one of FIGS. 3, 5, 6a, 7, 8 and 9), there may be more than one PCRF session DB (as illustrated on FIGS. 8 and 9). The architecture may also involve user terminals, load balancers (as illustrated on FIGS. 7, 8 and 9), configuration databases (associated with the PCRFs), a TDF, an AF (as illustrated on FIG. 6b), a BBERF, and an OCS, etc.

Although FIG. 1 illustrates first PCC rules and second PCC rules, these pieces of policy decision information may be replaced more generally by any policy decision information determined by the PCRF, without being limited to PCC rules. The policy decision information may comprise any one of: PCC rules (see for instance reference [7], subclause 4.5.2, entitled: "*Provisioning of PCC rules*"), event triggers (see for instance reference [7], subclause 4.5.3, entitled "*Provisioning of Event Triggers*"), charging related information (see for instance reference [7], subclause 4.5.4, entitled "*Provisioning of charging related information for the IP-CAN session*"), authorized QoS (see for instance reference [7], subclause 4.5.5, entitled "*Provisioning and Policy Enforcement of Authorized QoS*"), event report indication (see for instance reference [7], subclause 4.5.11, entitled "*Provisioning of Event Report Indication*"), usage monitoring information (see for instance reference [7], subclause 4.5.16, entitled "*Requesting Usage Monitoring Control*"), ADC rules (see for instance reference [7], subclause 4.6.1, entitled "*Request for ADC rules*"), etc., or a combination thereof.

Furthermore, the processing of the IP-CAN session modification by the second PCRF 202 results in the second PCRF 202 providing, in step s100, to at least one of the PCEF 100 and the PCRF client, the second policy decision information. Namely, the processing of the IP-CAN session modification by the second PCRF may at least result in the following situations (without being limited to these situations however): (a) if the IP-CAN session modification indication originated from the PCEF, the second PCRF sending the second policy decision information to the PCEF (as illustrated on FIG. 1, step s100, as far as PCC rules are concerned); or (b) if the IP-CAN session modification indication originated from another PCRF client than the PCEF: (b1) the second PCRF sending the second policy decision information to the PCEF; (b2) the second PCRF sending the second policy decision information to the other PCRF client from which the IP-CAN session modification indication originated; or (b3) the second PCRF sending a first part of the second policy decision information to the PCEF and a second part of the second policy decision information to the other PCRF client from which the IP-CAN session modification indication originated.

Figure 6A:
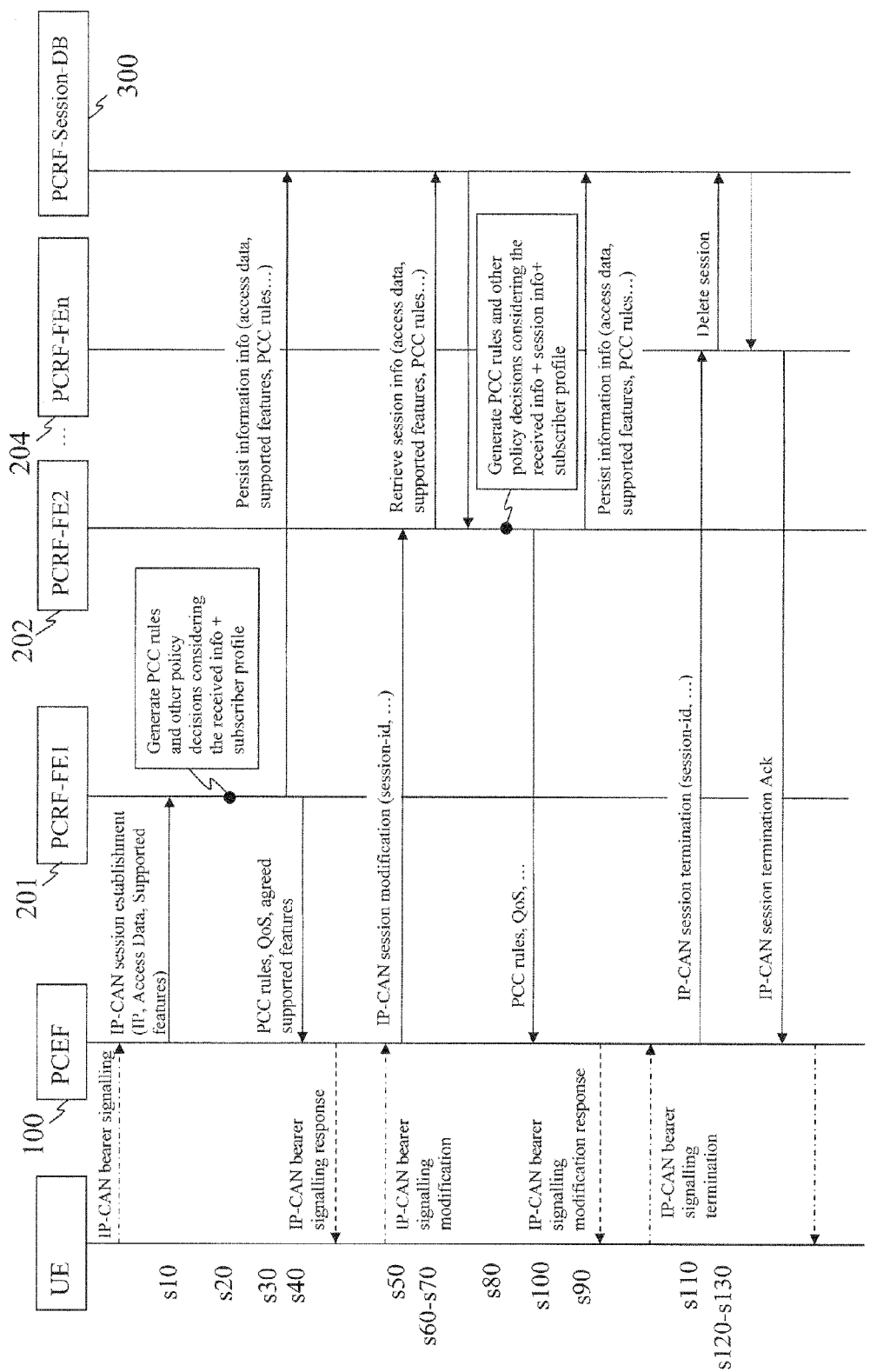
FIG. 6a is a message sequence chart of a method in one embodiment of the invention.
Figure 6B:
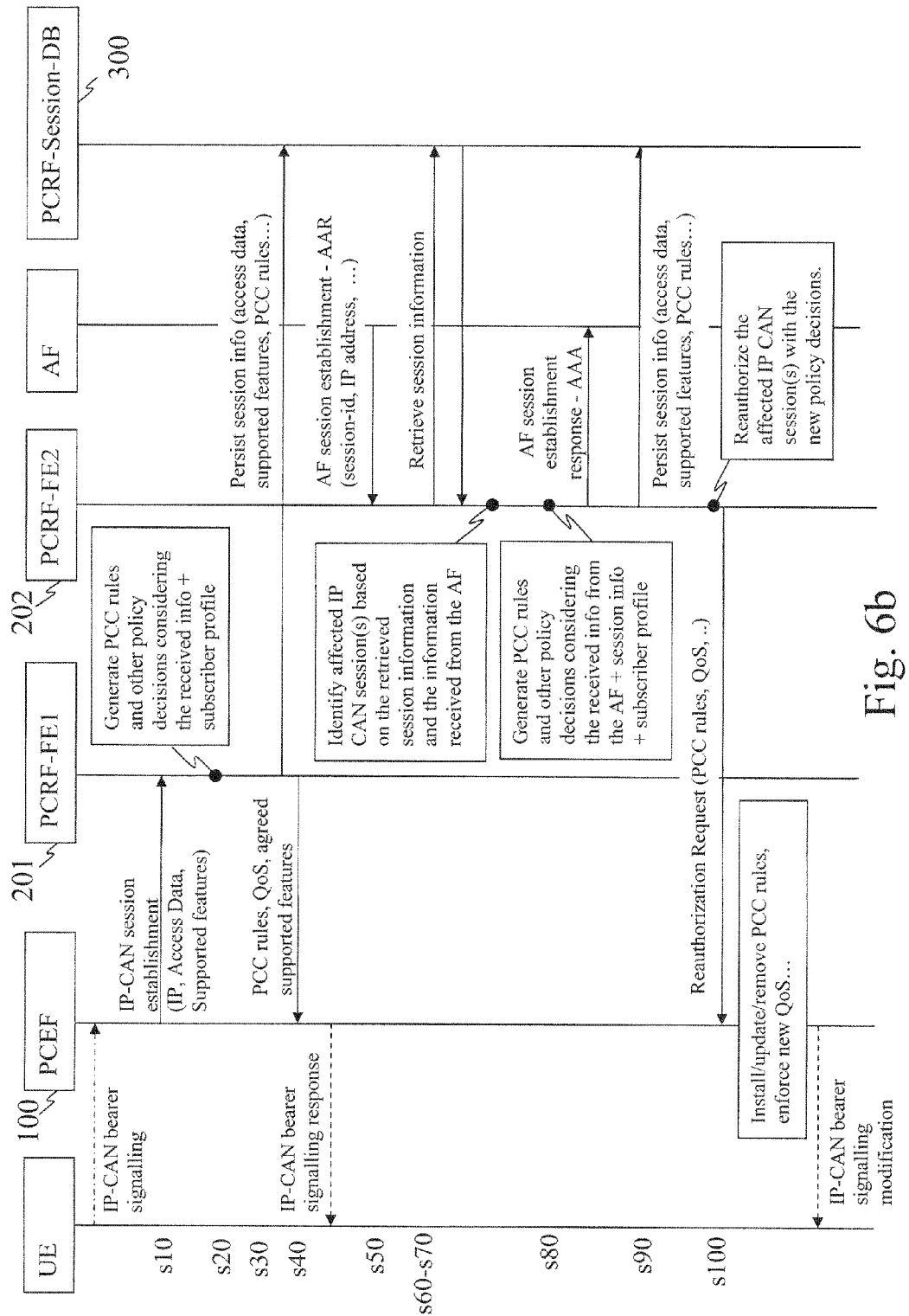
FIG. 6b is a message sequence chart of a method in another embodiment of the invention.

For example, the interaction between a PCRF and an AF may result in generating dynamic PCC rules to be installed on the PCEF (as will be apparent for example with reference to FIG. 6b, step s100). In another example, in a deployment where there may be a session between a PCRF and a BBERF, an AF interaction may cause as well the generation of QoS rules to be sent to the BBERF. In yet another example, ADC rules may be generated by a PCRF and installed on a TDF.

Figure 2A:
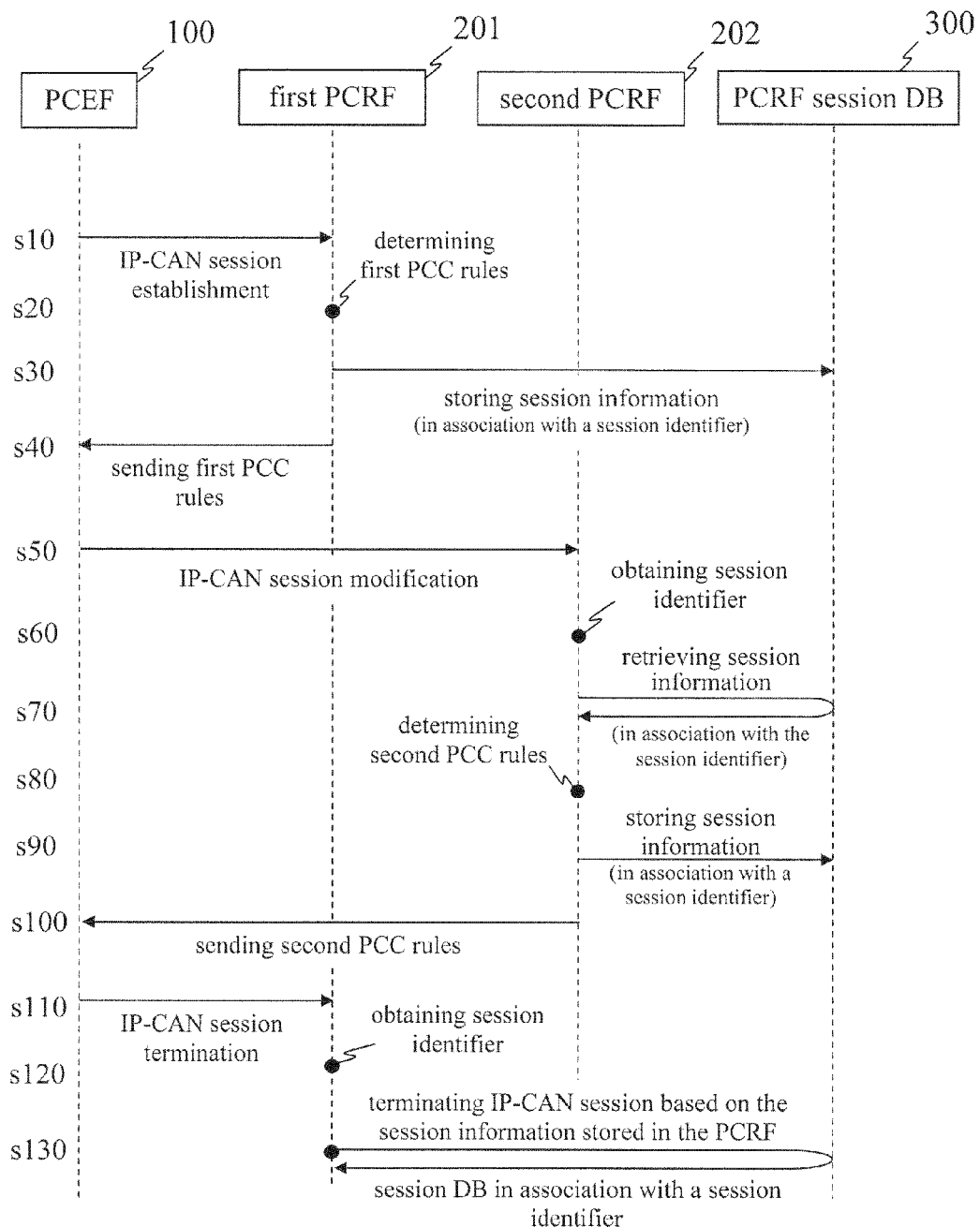
FIG. 2a is a message sequence chart of a method in one embodiment of the invention, which differs from the embodiment described with reference to FIG. 1 in that, on FIG. 2a, an IP-CAN session termination is further handled by the first PCRF.

FIG. 2a is a message sequence chart illustrating a method in one embodiment of the invention, which differs from the method illustrated in FIG. 1 by the following steps s110 to s130 performed after step s100.

In step s110 (as illustrated by the arrow labelled "IP-CAN session termination"), an IP-CAN session termination indication is received by first PCRF 201 from PCEF 100. Reference [1], subclause 7.3 (entitled "*IP CAN Session Termination*"), illustrates an exemplary signalling flow for an IP-CAN session termination.

The IP-CAN session termination indication is received by first PCRF 201 rather than by second PCRF 202 for example because a failure of second PCRF 202 occurred or because an intermediate load balancer (not illustrated on FIG. 2a), located between PCEF 100 and first and second PCRFs 201, 202, has directed the PCEF request towards first PCRF 201 rather than towards second PCRF 202.

In step s120 (as illustrated by the dot labelled "obtaining session identifier"), first PCRF 201 obtains or derives, from the IP-CAN session termination indication received from PCEF 100, the session identifier of the IP-CAN session.

In step s130 (as illustrated by the arrow labelled "terminating IP-CAN session based on the session information stored in the PCRF session DB in association with a session identifier"), first PCRF 201 then terminates the IP-CAN session based on the session information stored in database 300 in association with the session identifier of the IP-CAN session (obtained or derived in step s120). The relevant information that first PCRF 201 needs in the case of the termination, may relate to the AF, TDF, OCS sessions associated or linked with this terminated IP-CAN session, so that these AF, TDF, OCS nodes are notified by first PCRF 201 (see for example reference [1], subclause 7.3.1). First PCRF 201 should remove from database 300 the related session information.

This therefore provides a graceful termination of the IP-CAN session, even if for example second PCRF 202 is no longer available.

Figure 2B:
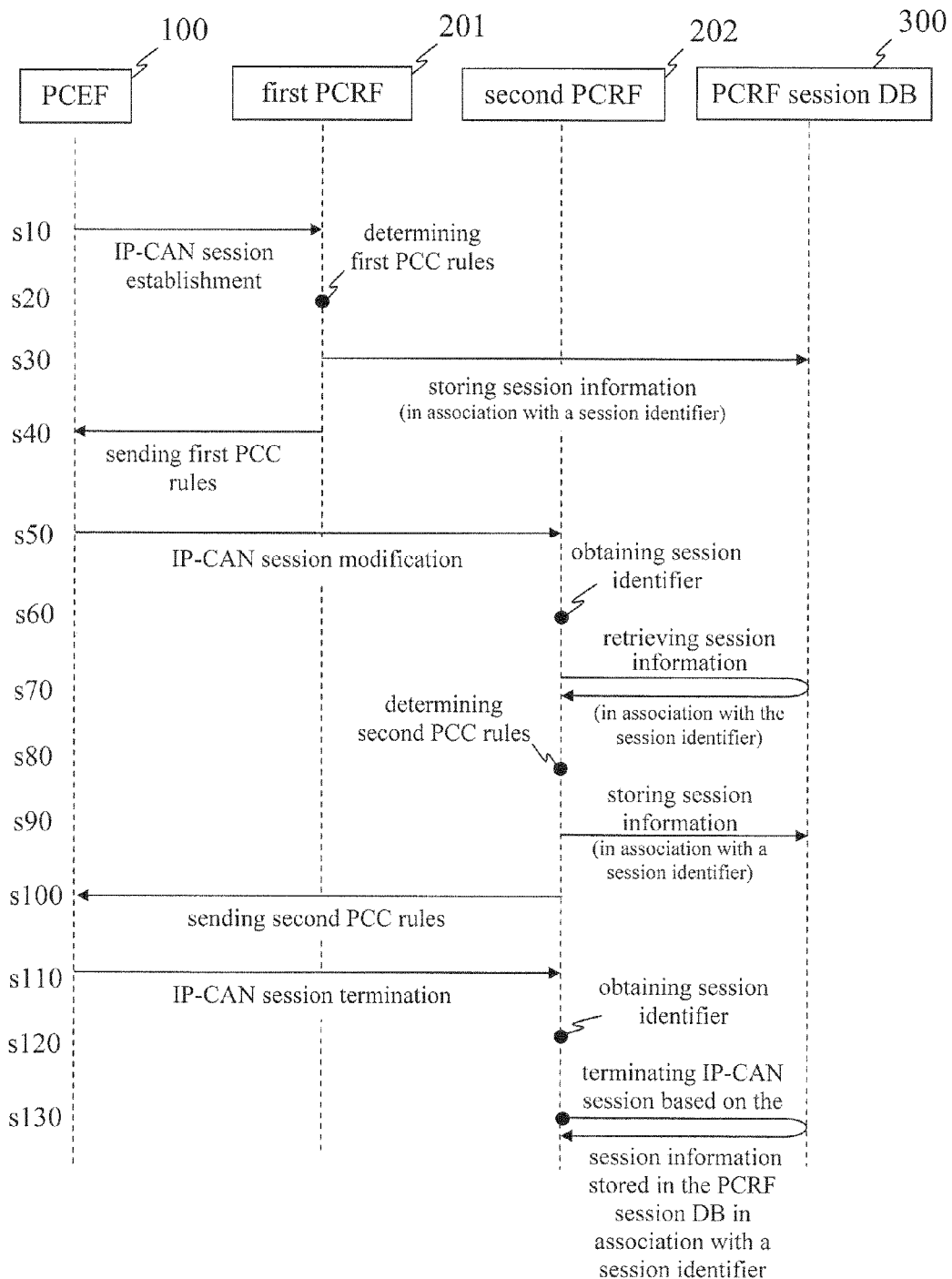
FIG. 2b is a message sequence chart of a method in one embodiment of the invention, which differs from the embodiment described with reference to FIG. 1 in that, on FIG. 2b, an IP-CAN session termination is further handled by the second PCRF.

FIG. 2b is a message sequence chart illustrating a method in one embodiment of the invention, which differs from the method illustrated in FIG. 2a in that steps s110 to s130 are performed by second PCRF 202 rather than by first PCRF 201.

Namely, in step s110, an IP-CAN session termination indication is received by second PCRF 202; in step s120, second PCRF 202 obtains or derives, from the received IP-CAN session termination indication, the session identifier of the IP-CAN session; and, in step s130, second PCRF 202 terminates the IP-CAN session based on the session information stored in database 300 in association with the session identifier of the IP-CAN session (obtained or derived in step s120).

The IP-CAN session termination indication is received by second PCRF 202 rather than by first PCRF 201 for example because a failure of first PCRF 201 occurred or because an intermediate load balancer (not illustrated on FIG. 2b), located between PCEF 100 and first and second PCRFs 201, 202, has directed the PCEF request towards second PCRF 202 rather than towards first PCRF 201.

This therefore provides a graceful termination of the IP-CAN session, even if for example first PCRF 201 is no longer available.

Figure 3:
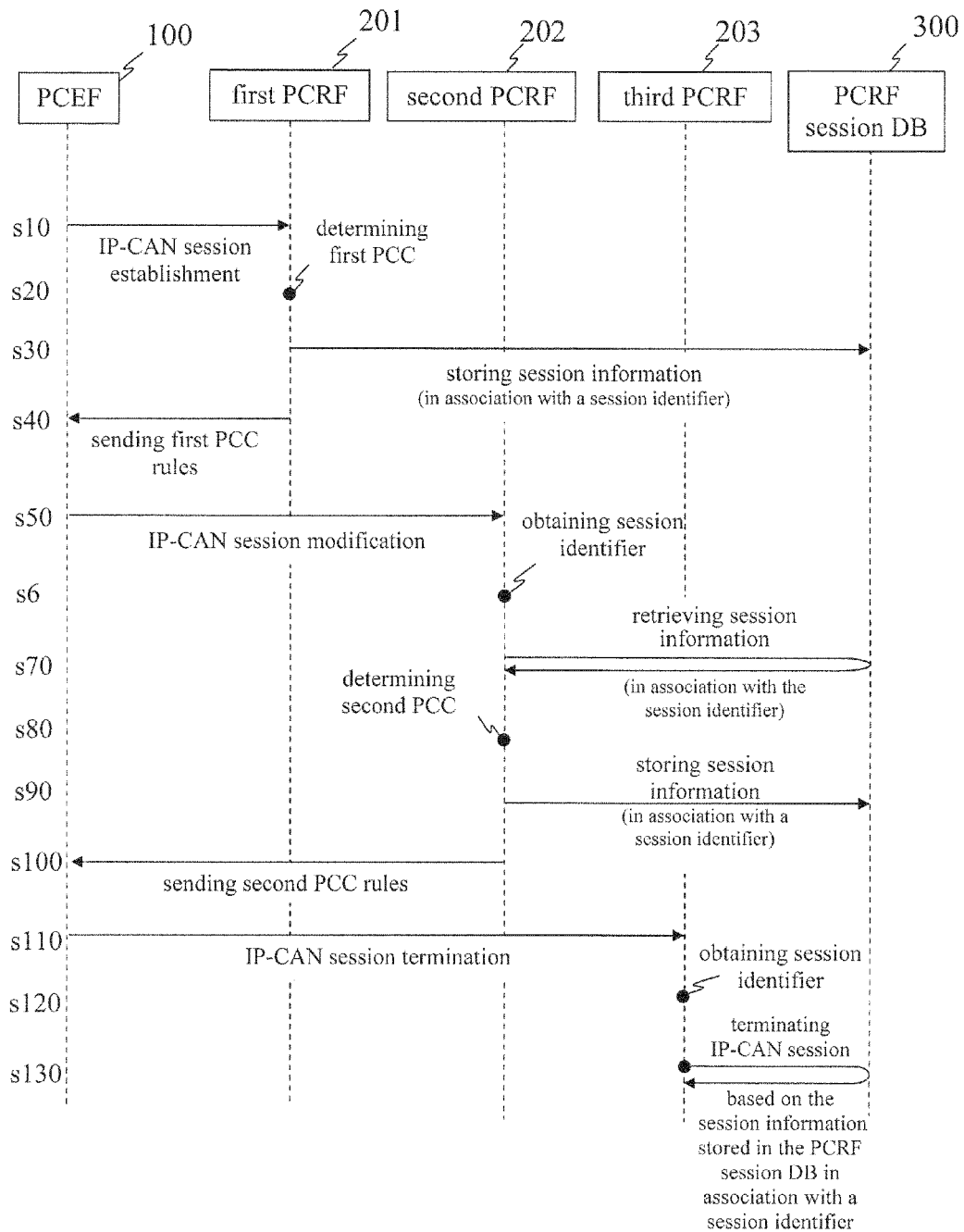
FIG. 3 is a message sequence chart of a method in one embodiment of the invention, which differs from the embodiment described with reference to FIG. 1 in that, on FIG. 2b, an IP-CAN session termination is further handled by a third PCRF.

FIG. 3 is a message sequence chart illustrating a method in one embodiment of the invention, which differs from the methods illustrated in FIGS. 2a and 2b in that steps s110 to s130 are performed by a third PCRF 203 rather than by first PCRF 201 or second PCRF 202. PCRF session DB 300 is accessible by third PCRF 203.

Namely, in step s110, an IP-CAN session termination indication is received by third PCRF 203; in step s120, third PCRF 203 obtains or derives, from the received IP-CAN session termination indication, the session identifier of the IP-CAN session; and, in step s130, third PCRF 203 terminates the IP-CAN session based on the session information stored in database 300 in association with the session identifier of the IP-CAN session (obtained or derived in step s120).

The IP-CAN session termination indication is received by third PCRF 203 rather than by first or second PCRFs 201, 202 for example because a failure of both the first and second PCRFs 201, 202 occurred or because an intermediate load balancer (not illustrated on FIG. 3), located between PCEF 100 and first, second and third PCRFs 201, 202, 203, has directed the PCEF request towards third PCRF 203 rather than towards first or second PCRFs 201, 202.

This therefore provides a graceful termination of the IP-CAN session, even if for example both first PCRF 201 and second PCRF 202 are no longer available.

Now, to further understand the advantages of the invention, the context in which some embodiments of the invention have been developed and may be put into practice will be explained in more detail (notably with reference to FIG. 4), followed by the description of further embodiments.

Figure 4:
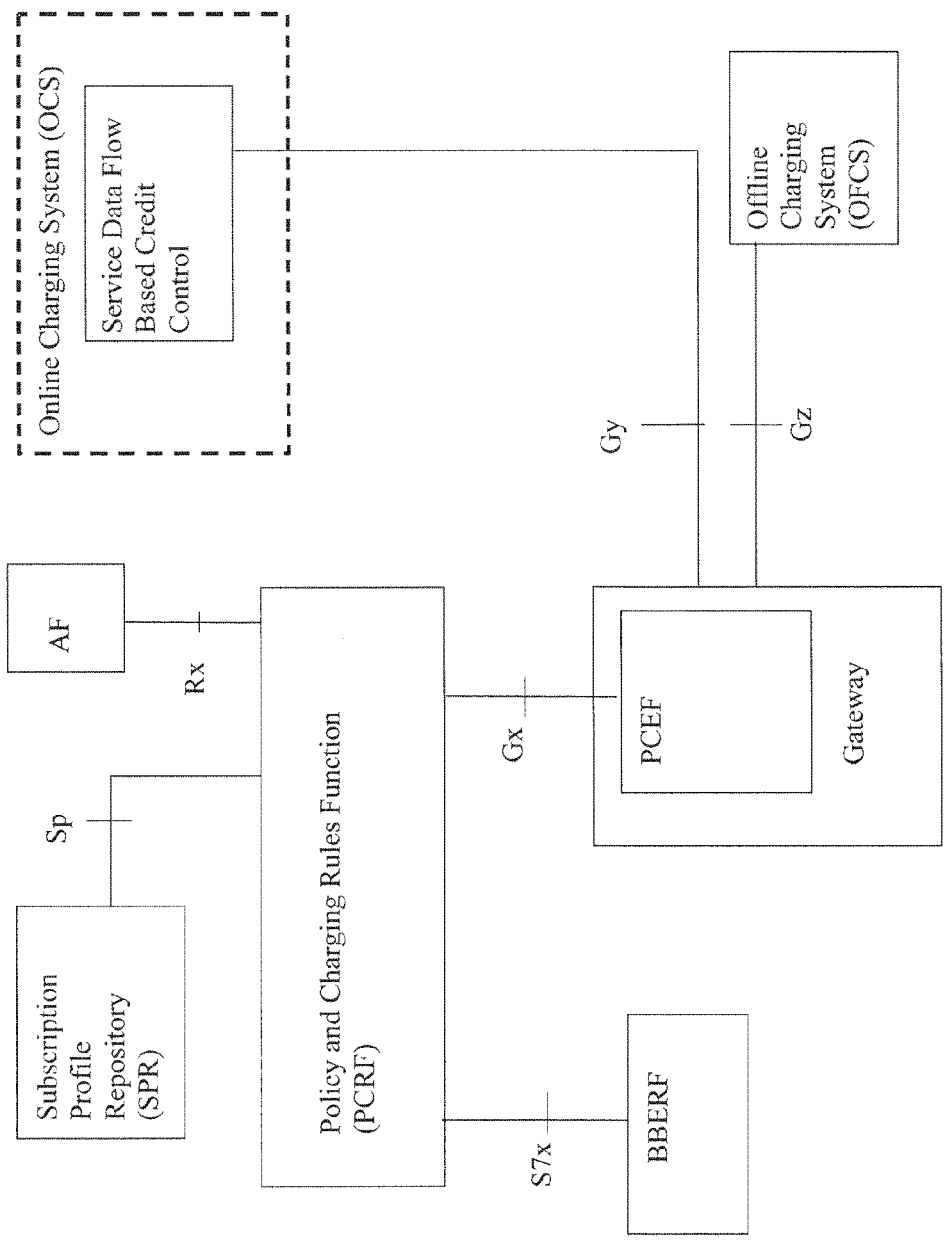
FIG. 4 schematically illustrates a PCC architecture in the context of which some embodiments of the invention may be implemented.

An exemplary PCC architecture is schematically illustrated on FIG. 4, which comes from TS 23.203 (V.9.5.0) (another version of reference [1]) that specifies the PCC functionality for Evolved 3GPP Packet Switched domain, including both 3GPP accesses (GERAN/UTRANE-UTRAN) and Non-3GPP accesses. Some embodiments of the invention may involve improvements in the PCRF, the PCEF, the BBERF, and the AF, but are not limited to these network nodes.

The PCC architecture illustrated on FIG. 4 may be described as follows.

The PCRF is a functional element that encompasses policy control decision and flow based charging control functionalities. The PCRF provides network control regarding the service data flow detection, gating, QoS and flow based charging (except credit management) towards the PCEF and towards the BBERF. The PCRF receives session and media related information from the AF and informs AF of traffic plane events. The PCRF provides PCC rules to the PCEF via for example the Gx reference point, in order to provide information to the PCEF on the treatment to be applied to each service data flow under PCC control, in accordance with the PCRF policy decision(s). Likewise the PCRF may provide PCC rules, such as QoS rules, to the BBERF.

According to reference [1], a prior art PCRF stores the session information. The amount of session information stored by the PCRF is large and the session information is highly dynamic, i.e. the information changes frequently. Although, in the PCC architecture, an SPR or a user data repository (UDR) may be used, this is only to retrieve subscription profile information (see reference [1], subclause 5.1, note 1, and subclause 5.2.3.2). In the prior art, all requests (originating for example from a PCEF and an AF) relating to a particular session must reach the same PCRF when multiple and separately addressable PCRFs have been deployed (see reference [1], subclause 7.6, discussing the DRA; and reference [6], subclause 7.2, entitled "*DRA Definition*").

The AF is an element offering applications, for which service is delivered in a different layer (i.e. transport layer) from the one the service has been requested (i.e. signalling layer), the control of IP bearer resources according to what has been negotiated. One example of an AF is the proxy call session control function (P-CSCF) of the IP Multimedia core network (IM CN) subsystem. The AF communicates with the PCRF to transfer dynamic session information (i.e. description of the media to be delivered in the transport layer). This communication may be performed using the Rx interface.

The PCEF encompasses service data flow detection (based on the filters definitions included in the PCC rules), as well as online and offline charging interactions (not described here) and policy enforcement. Since the PCEF is the one handling the bearers, it is in the PCEF that the QoS is enforced for the bearer according to the QoS information coming from the PCRF. This functional entity may be located in a gateway (e.g. gateway GPRS support node (GGSN) in the General Packet Radio Service (GPRS) case, and packet data gateway (PDG) in the WLAN case). For the cases where there is PMIP (Proxy Mobile IPv6) instead of GPRS Tunneling Protocol (GTP) between BBERF and PCEF, the bearer control is done in the BBERF instead. The BBERF includes bearer binding, uplink bearer binding verification and event reporting to the PCRF.

The TDF monitors the payload and detects when an application is initiated or terminated upon request from the PCRF or in an unsolicited manner. To this end, the TDF may be equipped or include so-called deep packet inspection (DPI) techniques. The TDF may be provided as a standalone node or as an integral part of the PCEF. The PCRF may instruct the TDF (or PCEF) what enforcement actions to apply for the detected application traffic.

In scenarios where more than one addressable PCRF is deployed in an operator network, an optional logical entity, namely a Diameter Routing Agent (DRA) function, may be used in the PCC architecture. This entity ensures that all Diameter sessions, through for example the Gx, Gxx, S9 and Rx interfaces, find the same PCRF. This is needed because the prior art PCRF is defined as a stateful entity, i.e. it needs to maintain session information in order to take policy decisions.

Let us now discuss some of the problems addressed by embodiments of the invention, for further understanding the context in which some embodiments of the invention have been developed.

The PCC architecture has been defined in the prior art essentially without considering failover and recovery mechanisms of the involved entities. While for example "3*GPP TS* 23.007 *V*9.10.0 (2011-12), *Technical Specification, 3rd Generation Partnership Project; Technical Specification Group Core Network and Terminals; Restoration procedures (Release* 9)" specifies failover and restoration mechanisms for most of the core network elements, network elements of the PCC architecture have not been addressed.

On the other hand, reference [2] provides an analysis of different PCRF failover and recovery scenarios. Some of those solutions (for example solutions 5 and 8 in reference [2]) allow the PCRF to resynchronize the PCC data between clients and the PCRF once the PCRF is recovered.

These solutions are based on the following considerations:
  (i) When more than one PCRF is deployed in the operator network, each PCRF is defined as a different physical host, without direct interactions between them.
  (ii) When more than one PCRF is deployed, the PCRF client finds the triggered PCRF based on the destination host provided by the DRA or using an additional entity that indicates the new PCRF to the PCRF client.
  (iii) The PCRF clients should always be able to be up-to-date with the latest available session data, i.e. with the session data that was available when the PCRF failed. However, the mechanism(s) for updating the PCRF clients is not disclosed (i.e., frequency, data to be stored per client, etc.).
  (iv) Moreover, these solutions do not disclose, once the PCRF is up again, how the session data are recovered from the PCRF clients. The period of PCRF inactivity and thus the possibility that the data is obsolete and non-reusable is not considered.

On the other hand, the PCRF node supports Diameter as the protocol used in all the specified reference points. The Diameter Base Protocol is described in P. Calhoun et al, "*Diameter Base Protocol, Request for Comments:* 3588", The Internet Society, Network Working Group, September 2003, which specifies some failover and recovery mechanisms.

For the restoration procedures, Diameter assumes that other Diameter servers may take the control of the current services. Retrieval of the data handled by the previous server is not considered.

Many existing deployments rely on Diameter mechanisms to ensure the reliability of the nodes that support this protocol, and to provide failover mechanisms. However, as described above, Diameter has some limitations that make it unsatisfying.

One class of solutions to this problem uses geographical redundancy, wherein there are two instances of PCRF within a same physical node. From the PCRF client perspective, the two instances are regarded as a unique PCRF (referred with a unique Diameter Destination-Host AVP). Thus, when the active PCRF fails, the stand-by PCRF can take the control, becoming the new active PCRF, without involving the clients. This solution allows the new active PCRF to take the control of all new sessions being established, since it has replicated all the non-volatile data (e.g. subscription data) in an accessible database. However, since the volatile data is lost, on-going sessions cannot be handled and do not survive.

These solutions thus only work for the new sessions, since the PCRF may have lost the dynamic data for the active sessions. On-going sessions established prior to the switch over between primary and stand-by node will be closed, since, upon reception, by the new active PCRF, of a session modification request of a previously established session, the new PCRF will answer with a Diameter session unknown, and the session will be closed.

Reference [4] proposes a solution to recover on-going sessions, by rebuilding in the PCRF a session upon reception of a session modification request from the PCEF. The solution includes receiving an update request for a session that does not exist in the PCRF, and creating a session state in the PCRF with information received in the update request. However, with the information received in the session modification request, the PCRF may not be able to create the session and take the right decisions. For example, in a normal procedure, the PCEF may only send location information to the PCRF if the UE location has changed since the last reauthorization request. If there are policy decisions based on location information, the stand-by PCRF node taking the role of active node as part of a switch over procedure may not be able to evaluate these location policies in the absence of information about the UE location. Further, since both the PCEF and the PCRF support are negotiated only during the first interaction at session establishment and they apply during the whole IP-CAN session, the stand-by PCRF node becoming active may not know, upon receiving a modification request, the capabilities negotiated when the session was established. In summary, the new active PCRF may not have sufficient information to provide valid PCC rules so that the approach of reference [4] only provides a best effort solution.

A possible solution to this problem may involve synchronizing PCRFs, i.e. the active PCRF keeps the stand-by PCRF up-to-date with all the relevant dynamic session data. However, due to the nature of this node, the dynamic data may be changed very often, and this would therefore require high internal processing in the node. In other words, continuous updating from an active PCRF to its stand-by PCRF is very demanding from a network load and performance perspective.

Reference [5] provides an enhancement to the mechanism proposed in reference [4]. Namely, reference [5] proposes that, once the standby PCRF2 becomes acting due to a failure of the primary PCRF1, the PCRF2, upon the reception of a Credit Control Request (CCR) modification request from the PCRF client for certain user IP-CAN session, issues a request towards the PCRF client indicating to send all the information it has regarding that session. This information comprises, at least, all the AVPs that are mandatory to be sent in a CCR initial, plus any other information the PCEF could have for that session, such as PCC rules downloaded by PCRF1 before it failed.

This last approach solves the above-described problem but it imposes special requirements onto the PCEF, which shall be able to send upon request from the PCRF all the session information, including the list of policy rules installed.

In addition to the failover mechanisms, another aim in a PCC architecture is to provide scalability.

Depending on the number of subscribers and the traffic model of each operator, and considering the capacity in terms of memory and processing of the PCRF node, it may be needed to deploy several PCRFs in the network.

As the prior art PCRF is stateful, it is required that, when there are several PCRFs deployed, it shall be ensured that the PCRF handling a specific IP-CAN session shall receive all the requests corresponding to that session (modification and termination requests of all the interfaces, Gx, Rx, Sy, etc.).

A solution is based on the Diameter routing agent, a central entity that can redirect the Diameter requests based on the realm. However this solution requires that the Network Access Identifier (NAI) be used as user identity and it is not valid when other types of subscriber identities are used. The solution imposes additional network deployment requirements, such as one realm per site, which is not always the case. Besides, this is not valid for PCRF interfaces not based on Diameter.

In view of the above, some embodiments of the invention aim at addressing two problems, namely, on the one hand, geographical redundancy in deployments with a primary PCRF and a stand-by PCRF and, on the other hand, scalability.

The inventors have recognized that, in prior art solutions, specific difficulties arise from the fact that the PCRF is stateful and requires access to the dynamic information to take the right policy decisions, the dynamic information being defined as the information received from the access network plus information calculated by the PCRF in previous requests.

Some embodiments of the invention therefore propose to transform the PCRF in a stateless front end (FE), and store the dynamic information in a common database (DB) shared by the different stateless FEs.

Figure 5:
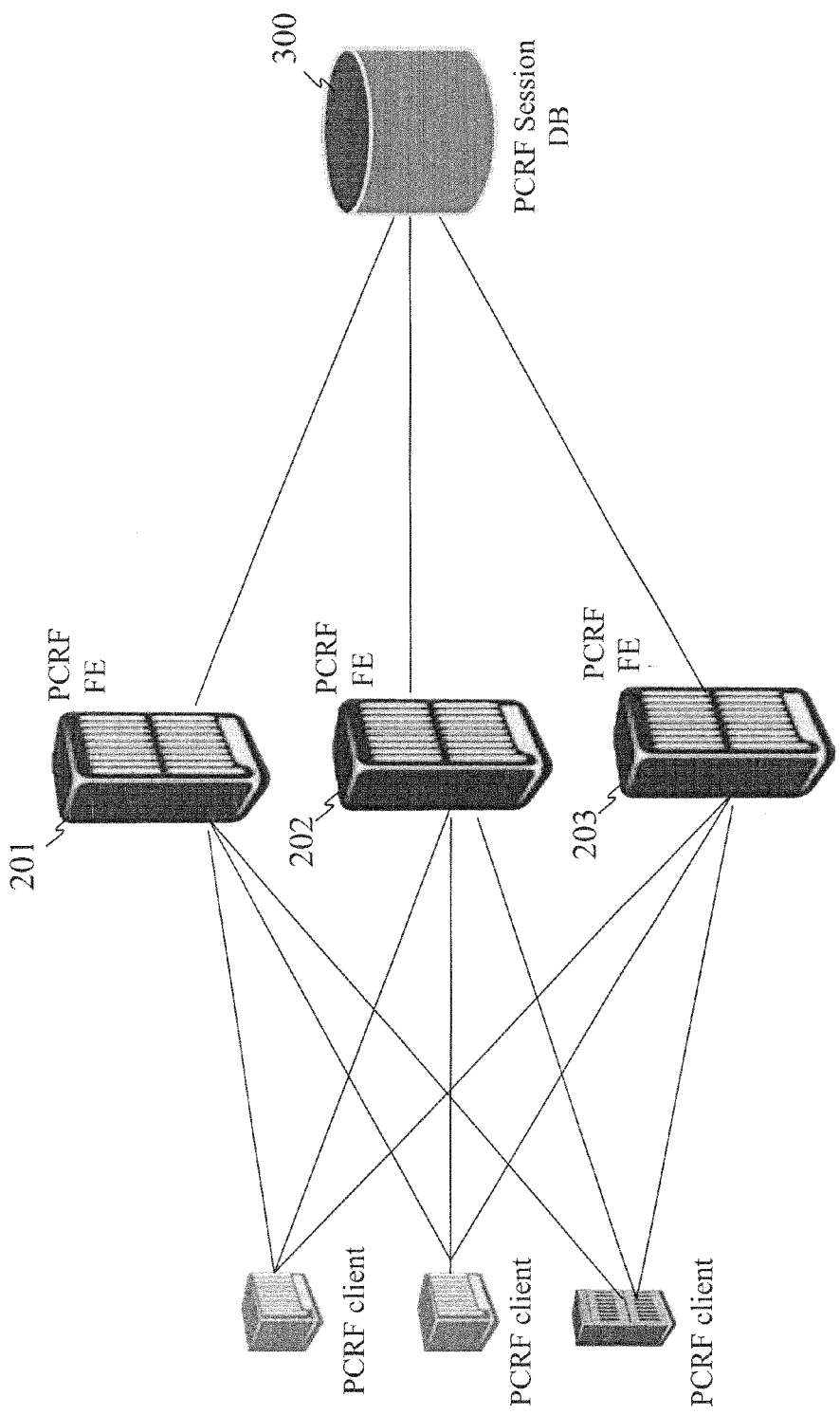
FIG. 5 schematically illustrates a system including a plurality of PCRFs and a PCRF session database in one embodiment of the invention.

FIG. 5 schematically illustrates a system in one embodiment of the invention wherein any PCRF neighbour (for example: packet data network gateway (PDN-Gw) (such as one hosting a PCEF), AF, TDF, OCS, BBERF, etc.) can contact at any time with any PCRF-FE 201, 202, 203 deployed in the network. In the system illustrated by FIG. 5, the SPR is hosted on the same node as the PCRF session DB 300. However, the SPR may also be hosted on a different network node than the one hosting the PCRF session DB 300.

This architecture no longer requires that, once a session is managed by one PCRF, all the subsequent requests (i.e., all sessions involving the PCRF, through for example the Gx, Gxx, S9 or Rx interfaces) have to be managed by the same PCRF. A diameter routing agent (DRA) may thus be dispensed with.

Further, the geographical redundancy requirement is also addressed, since if any of the PCRF-FEs fails, the rest of the PCRFs-FE can handle the on-going and new sessions without interruption.

In one embodiment, the PCRF session DB 300 depicted in FIG. 5 is implemented as a cloud of repositories serving the PCRF-FEs 201, 202, 203.

In one embodiment, to ensure that each of the PCRF-FEs 201, 202, 203 can retrieve the session information as fast as if, or almost as fast as if, the session information was stored locally in the PCRF, the PCRF session DB 300 is a repository set up specifically for that purpose. In one embodiment, PCRF session DB 300 is not a shared repository such as a UDR. In one embodiment, PCRF session DB 300 is collocated very close to the PCRF to assure a low latency. This means, in a sub-embodiment, that PCRF session database 300 is accessible by each of PCRF-FEs 201, 202, 203 through a LAN connection, which may notably use, but is not limited to, Ethernet over twisted pair cabling, Wi-Fi, Token Ring, or ARCNET.

FIG. 6a is a message sequence chart of a method in one embodiment of the invention, involving an IP-CAN session establishment, an IP-CAN session modification initiated by the PCEF, and an IP-CAN session termination. The UE schematically illustrated on FIG. 6a may be any type of communication terminal such as, for example, a mobile phone, a smartphone, a laptop, a desktop computer, a tablet PC, a gaming device, etc.

In step s10, a first session establishment request for a new session reaches a PCRF-FE1 201 (as illustrated by the arrow labelled "IP-CAN session establishment (IP, Access Data, Supported features)"). The request comes from PCEF 100, which may have selected PCRF-FE1 201 among the available PCRF-FEn 201, 202, . . . , 204 based on a local selection mechanism, such as for example a round robin mechanism.

In step s20, PCRF-FE1 201 determines policy decision information i.e., generates policy decision information or selects applicable existing policy decision information based on the network information received and the subscriber profile (as illustrated by the box labelled "Generate PCC rules and other policy decisions considering the received info+subscriber profile").

In step s30, PCRF-FE1 201 persists the session information in the PCRF session database 300 (as illustrated by the arrow labelled "Persist information info (access data, supported features, PCC rules . . . )"). To do so, the PCRF-FE1 201 may use any protocol supported by the PCRF session database 300, such as for example SQL or LDAP.

In step s40, PCRF-FE1 201 returns policy decision information to PCEF 100 (as illustrated by the arrow labelled "PCC rules, QoS, agreed supported features"), which may then be enforced by PCEF 100. Step s40 may be done in parallel to, or before, step s30, provided that concurrent accesses to PCRF session database 300 are solved or prevented (as explained above with reference to FIG. 1).

In step s50, a session modification request for the same IP-CAN session reaches PCRF-FE2 202 (as illustrated by the arrow labelled "IP-CAN session modification (session-id, . . . )"). The request comes from PCEF 100, which may have selected PCRF-FE2 202 using a local selection mechanism, such as for example a round-robin mechanism.

In steps s60-s70, PCRF-FE2 202 retrieves the session information from PCRF session database 300 (as illustrated by the arrow labelled "Retrieve session info (access data, supported features, PCC rules . . . )"). To do so, the PCRF-FE2 202 may use any protocol supported by the PCRF session database 300, such as for example SQL or LDAP. In one embodiment, the protocol as well as the information model modelling the session are optimized to get the information in a single query.

In step s80, PCRF-FE2 202 determines PCC rules and other policy decision information—i.e. generates them or selects those existing ones which are applicable—considering the received network information, the subscriber profile and the session information (as illustrated by the box labelled "Generate PCC rules and other policy decisions considering the received info+session info+subscriber profile").

In step s90, PCRF-FE2 202 persists the session information in PCRF session DB 300 (as illustrated by the arrow labelled "Persist information info (access data, supported features, PCC rules . . . )").

In step s100, PCRF-FE2 202 returns policy decision information to the PCEF 100 (as illustrated by the arrow labelled "PCC rules, QoS, . . . "), which may then be enforced by PCEF 100. Step s100 may be done in parallel, or before, step s90, provided that concurrent accesses to the PCRF session database 300 are solved or prevented (as explained above with reference to FIG. 1).

In step s110, a session termination request for the same IP-CAN session reaches PCRF-FEn 204 (as illustrated by the arrow labelled "IP-CAN session termination (session-id, . . . )"). The request comes from PCEF 100, which may have selected PCRF-FEn 204 using a local selection mechanism, such as for example a round-robin mechanism.

In steps s120-s130, PCRF-FEn 204 removes the session information from PCRF session DB 300 and acknowledges the request to PCEF 100 (as illustrated by the arrows labelled "Delete session" and "IP-CAN session termination Ack" respectively).

Although not illustrated on FIG. 6a, but mentioned above, the session requests may be distributed amongst the plurality of PCRF-FEs. The load balancing, if any, may be implemented in the PCEF itself (the PCEF being therefore able to select one of the available PCRF-FEs, for example using a round-robin mechanism or based on other criteria such as IMSI ranges) or it may be implemented as a separate function executed by a separate load balancer system (located between the PCEF and the PCRF-FEs).

Furthermore, instead of a PCEF acting as PCRF client interacting with the PCRF FEs, other types of PCRF clients may participate in the method illustrated by FIG. 6a, as mentioned above. Each of these PCRF clients may also be configured to select one of the available PCRF-FEs, for example using a round-robin mechanism or based on other criteria such as IMSI ranges. Alternatively, a load balancer system located between the PCRF clients and the PCRF-FEs may be used.

FIG. 6b is a message sequence chart of a method in one embodiment of the invention, which differs from the embodiment of FIG. 6a as follows. The embodiment of FIG. 6b involves an IP-CAN session establishment processed by a first PCRF (labelled "PCRF-FE1"), followed by an AF session establishment referring to the same IP-CAN session and processed by a second PCRF (labelled "PCRF-FE2"). This AF session establishment referring to the same IP-CAN session causes an IP-CAN session modification.

In step s10, a session establishment request for a new IP-CAN session reaches PCRF-FE1 201 (as illustrated by the arrow labelled "IP-CAN session establishment (IP, Access Data, Supported features)"). The request comes from PCEF 100, which may have selected PCRF-FE1 201 among the available PCRF-FEs using for example a local selection mechanism, such as a round-robin mechanism.

In step s20, PCRF-FE1 201 generates policy decision information based on the network information received and the subscriber profile (as illustrated by the box labelled "Generate PCC rules and other policy decisions considering the received info+subscriber profile").

In step s30, PCRF-FE1 201 persists the session information in PCRF-Session-DB 300 (as illustrated by the arrow labelled "Persist session info (access data, supported features, PCC rules . . . )").

In step s40, PCRF-FE1 201 returns policy decision information to PCEF 100 (as illustrated by the arrow labelled "PCC rules, QoS, agreed supported features"). Step s40 may be done in parallel to, or before, step s30, provided that concurrent accesses to PCRF session database 300 are solved or prevented (as explained above with reference to FIG. 1).

In step s50, an AF session establishment request reaches PCRF-FE2 202 (as illustrated by the arrow labelled "AF session establishment AAR (session-id, IP address, . . . )", wherein AAR stands for "AA-Request"). The AF may have selected PCRF-FE2 202 using a local selection mechanism, such as for example a round-robin mechanism.

In steps s60-s70, PCRF-FE2 202 retrieves the session information from PCRF session DB 300 (as illustrated by the arrow labelled "Retrieve session information") and determines the affected IP-CAN session(s) using the information previously received from PCEF 100 (stored as part of the session information) and the service information received from the AF (as illustrated by the box labelled "Identify affected IP CAN session(s) based on the retrieved session information and the information received from the AF").

In step s80, PCRF-FE2 200 generates PCC rules and other policy decision information considering the application information received from the AF, the subscriber profile and the session information (as illustrated by the box labelled "Generate PCC rules and other policy decisions considering the received info from the AF+session info+subscriber profile").

PCRF-FE2 202 then sends an acknowledgment to the AF (as illustrated by the arrow labelled "AF establishment response—AAA", wherein AAA stands for "AA-Answer").

In step s90, PCRF-FE2 202 persists the session information in PCRF session DB 300 (as illustrated by the arrow labelled "Persist session info (access data, supported features, PCC rules . . . )").

Then, in step 100, PCRF-FE2 202 reauthorizes the affected IP-CAN session(s) by sending the policy decision information to PCEF 100 (as illustrated by the label "Reauthorization Request (PCC rules, QoS, . . . )"). Step s100 may be performed in parallel to, or before, step s90, provided that concurrent accesses to PCRF session database 300 are solved or prevented (as explained above with reference to FIG. 1).

Figure 7:
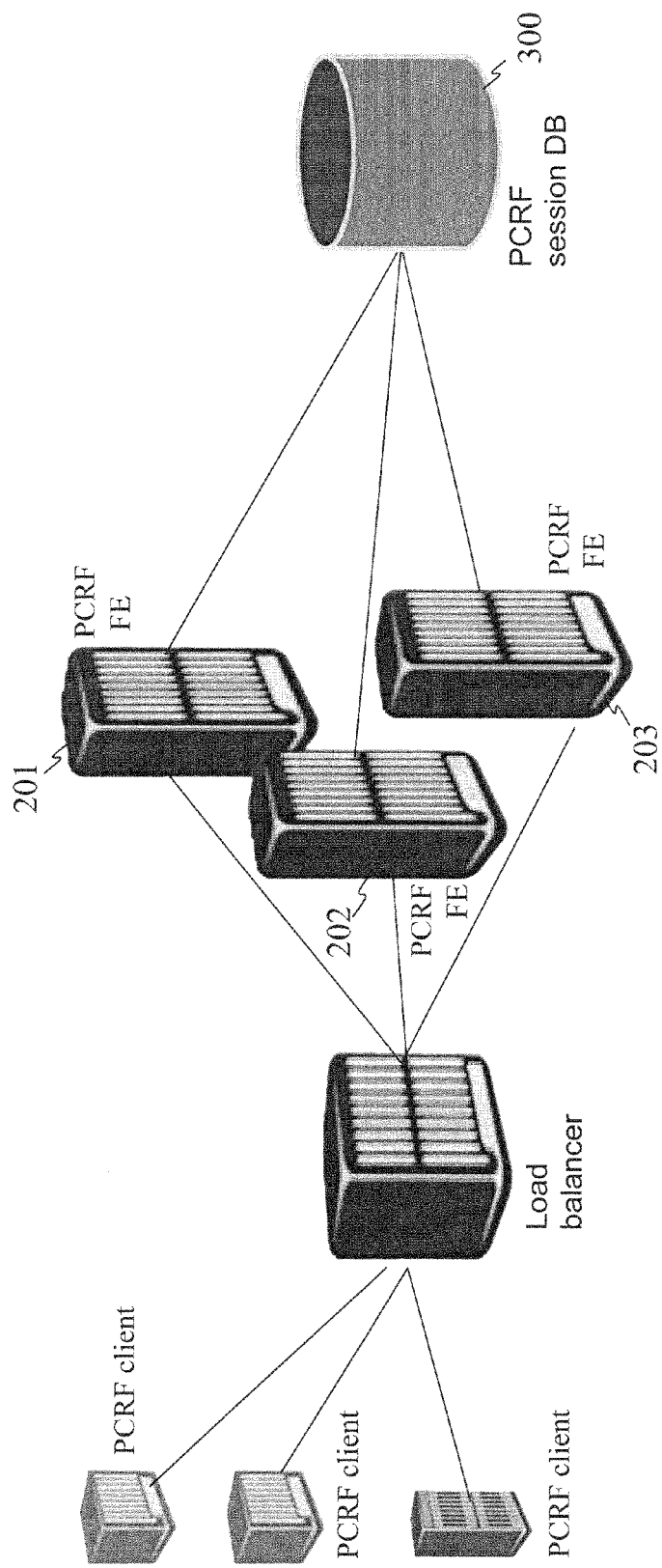
FIG. 7 schematically illustrates a system including a plurality of PCRFs, a PCRF session database, and a load balancer, in one embodiment of the invention.
Figure 8:
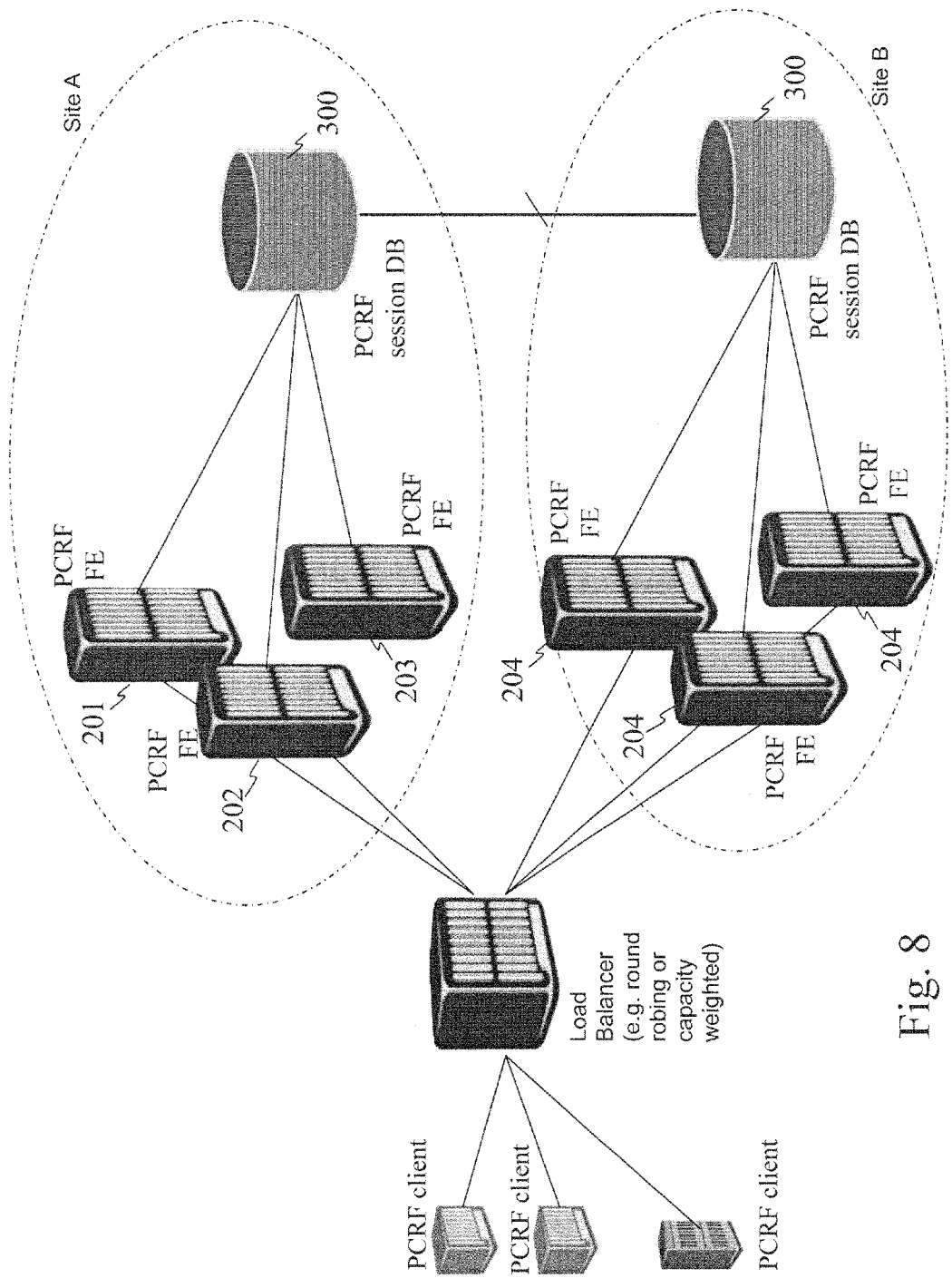
FIG. 8 schematically illustrates a system including a plurality of PCRFs, two PCRF session databases, and a load balancer, in one embodiment of the invention.
Figure 9:
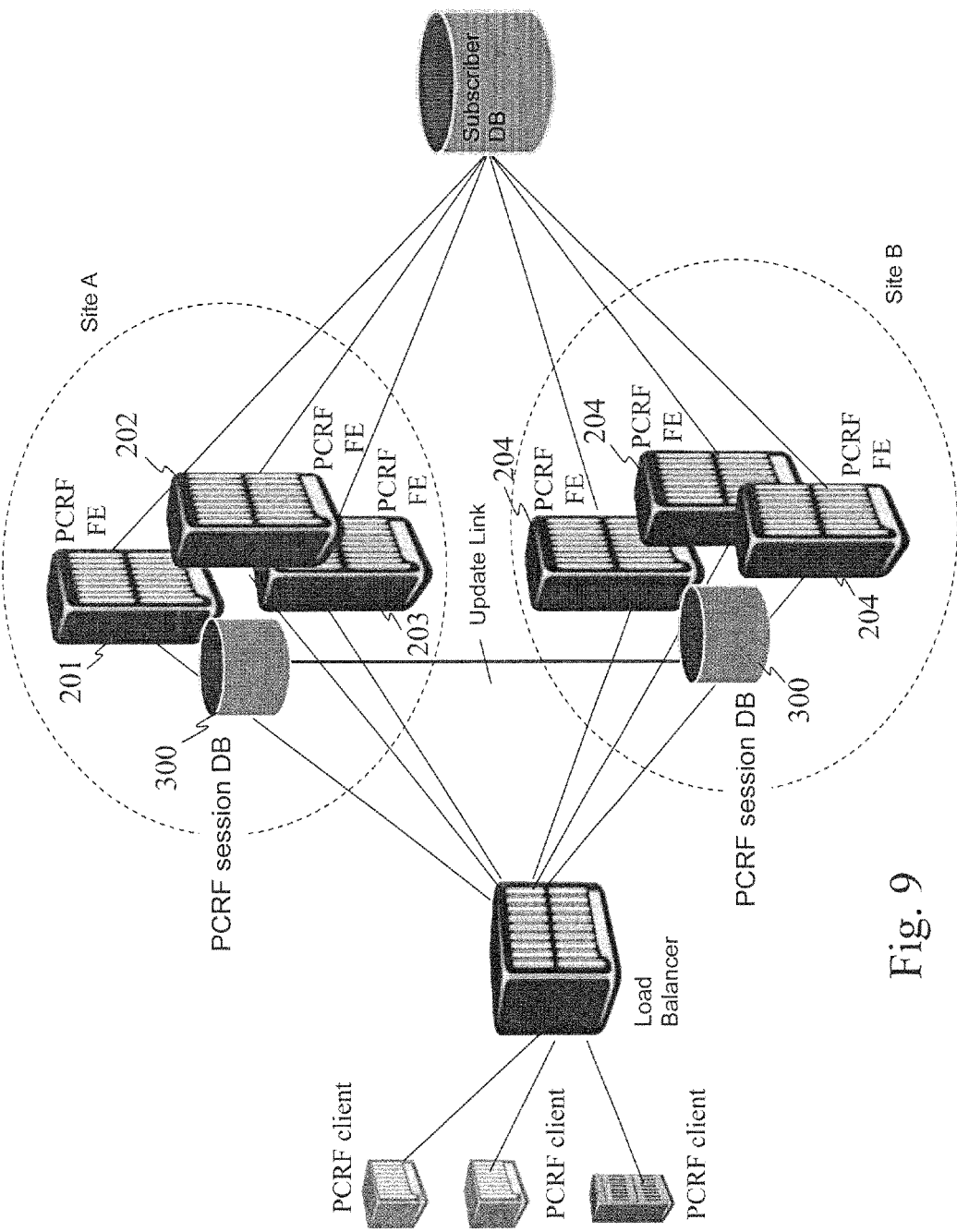
FIG. 9 schematically illustrates a system including a plurality of PCRFs, two PCRF session databases, a subscriber database and a load balancer, in one embodiment of the invention.

FIGS. 7 to 9 schematically illustrate systems according to embodiments of the invention. Furthermore, methods described with reference to any one of FIGS. 1, 2a, 2b, 3, 6a and 6b may be put into practice on the systems illustrated on any one of FIGS. 7 to 9.

FIG. 7 schematically illustrates a system in one embodiment of the invention. The system comprises a plurality of PCRFs 201, 202, 203, a PCRF session database 300, and a load balancer. In the system illustrated by FIG. 7, the SPR is hosted on the same node as the PCRF session DB 300.

However, the SPR may also be hosted on a different network node than the one hosting the PCRF session DB 300. Each of PCRFs 201, 202, 203 may notably store configuration information relating for example to the configuration of the neighbouring nodes such as information relating to PCEFs, AFs, TDFs, etc., deployed in the network. The configuration information may be needed for the PCRF to establish connections. Information stored on the PCRFs may also include internal PCRF values such as PCRF ID, timers, licenses, interfaces security related information, etc.

FIG. 8 schematically illustrates a system in one embodiment of the invention. The system comprises a plurality of PCRFs 201, 202, 203, 204, two PCRF session databases 300, and a load balancer. Each of PCRFs 201, 202, 203, 204 may also store configuration information as explained with reference to FIG. 7.

The three PCRFs 201, 202, 203 are located at one site ("Site A") and three other PCRFs 204 are located at another site ("Site B"). Both sites may manage traffic at the same time. A first PCRF session database 300 serves Site A and a second PCRF session database 300 serves Site B, thus providing geographical redundancy. A PCRF in one site always accesses the PCRF session DB 300 residing in its own site, i.e. PCRFs 201, 202, 203 in site A should not access to the PCRF session DB 300 of site B, for latency, stability and performance reasons. The PCRF session DB 300 accessed by the different PCRFs 201, 202, 203 may be advantageously in the same LAN or local fast network as the PCRFs 201, 202, 203 (as already mentioned above with reference to FIG. 5). The two PCRF session databases 300 are synchronized (with all the static and dynamic information). Database synchronization may for example be performed using a replication mechanism provided by a database, using for example a commercially available database providing such synchronization mechanism.

Whether replication of dynamic information, i.e. of sessions between both session DBs, is needed may depend on the following:

The system may be configured so that the load balancer can send any request to any PCRFs 201, 202, 203 residing in any of the sites A or B for any IP-CAN session. That means that a PCRF in site A may receive an initial session establishment request for a session, and then a PCRF in site B may receive a modification for that session. This requires supporting dynamic replication between PCRF session DB 300 in site A and PCRF session DB 300 in site B.

The system may be configured so that the load balancer divides the operator users between site A and site B. In such a manner, for a range of subscriber IDs, all the requests go only to site A, while, for another range of subscriber IDs, all the requests go only to site B. Only if session DB of site A goes down, or PCRF session DB 300 of site B goes down, i.e. one of the sites is off, the load balancer would redirect the traffic of any user to the active site. In this case, the PCRF session DB 300 need not be synchronized. In this case, the load balancer makes two balancings, one based on subscriber ID range to select between one site and the other, and another one based on weight or round robin or any other criteria to select between the PCRF-FEs of the selected site.

Therefore, a load balancer may distribute the requests among all PCRFs 201, 202, 203, 204, for example in a round robin or capacity weighted manner.

If one of the PCRF session DBs 300 fails, the load balancer is arranged to route all the traffic towards the site where the PCRF session DB 300 is active. The PCRFs of the site where the PCRF session DB 300 is down may detect this condition and may disable the connections towards the load balancer until the PCRF session DB 300 is up again.

In FIG. 8, a SPR is not illustrated (for the sake of conciseness). A SPR may be hosted on each of the nodes hosting a PCRF session DB 300, so that the SPR is duplicated. Alternatively, a unique SPR may be provided on a different network node than one hosting a PCRF session DB 300. The unique SPR may then be connected with both PCRF session DBs 300, as illustrated by FIG. 9. Namely, FIG. 9 schematically illustrates a system in one embodiment of the invention, which differs from FIG. 8 only in that a unique SPR, i.e. a unique subscriber database (labelled "Subscriber DB"), is illustrated.

The subscriber database stores user subscription information, therefore showing that the invention does not preclude the use of such a centralized subscriber database (according to UDR for example). The centralized subscriber database may be shared by different applications, such as PCRF, HSS, etc. When such a centralized subscriber database is used, the applications usually cache the information, so that they need not access the centralized subscriber database every time information is needed. Locally caching the information obtained from the centralized subscriber database is advantageous since the information does not change very often. In one embodiment, such caching is not used for the PCRF session information stored in the PCRF session DB(s) 300 (since the PCRF session information changes very often). The centralized subscriber database may also implement a notification mechanism to inform the applications if any information changes so that, only then, the applications retrieve the information again. In one embodiment, such a notification mechanism is not used for the PCRF session information stored in the PCRF session DB(s) 300 (since the PCRF session information changes very often).

Some advantages of embodiments of the invention are therefore as follows:

A PCRF scalability solution, avoiding the introduction of new functions in the network, such as a Diameter routing agent, is provided. Besides, the solution is valid independently of the protocols supported by the PCRF, that is, not limited to Diameter.

A solution is provided for PCRF geographical redundancy, avoiding a single point of failure in the PCRF, and ensuring that redundant PCRFs can attend any on-going or newly established sessions.

Figure 10:
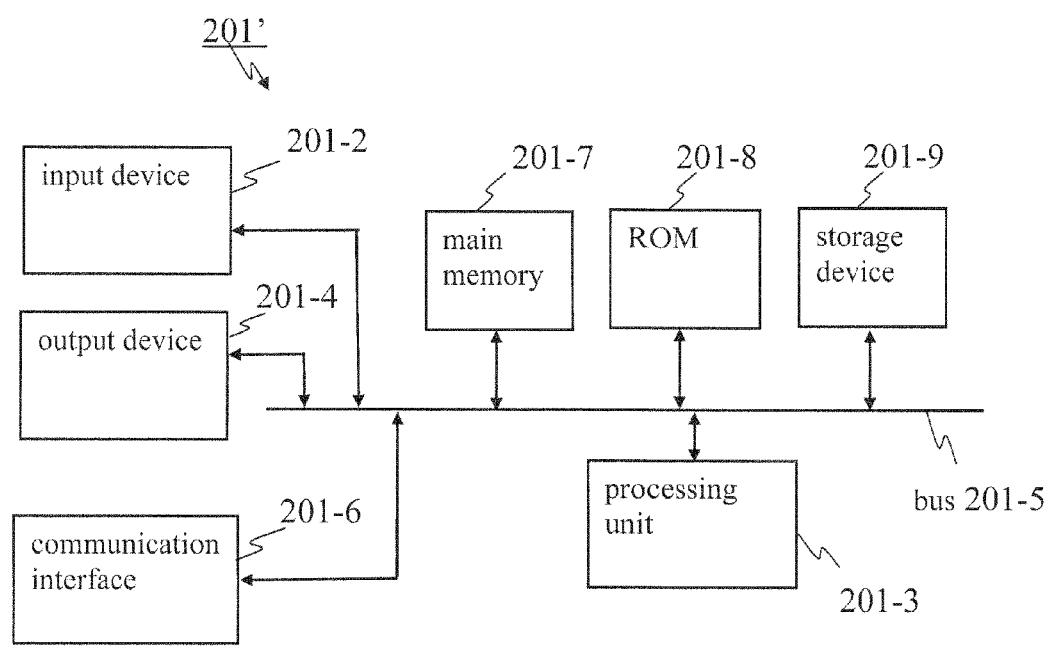
FIG. 10 is a schematic diagram of an exemplary implementation of a network node which may host a PCRF according to one embodiment of the invention.

FIG. 10 is a schematic diagram of an exemplary implementation of a network node 201' that may host a PCRF usable in embodiments of the invention. As illustrated, network node 201-0 may include a bus 201-5, a processing unit 201-3, a main memory 201-7, a ROM 201-8, a storage device 201-9, an input device 201-2, an output device 201-4, and a communication interface 201-6. Bus 201-5 may include a path that permits communication among the components of network node 201'.

Processing unit 201-3 may include a processor, a microprocessor, or processing logic that may interpret and execute instructions. Main memory 201-7 may include a RAM or another type of dynamic storage device that may store information and instructions for execution by processing unit 201-3. ROM 201-8 may include a ROM device or another type of static storage device that may store static information and instructions for use by processing unit 201-3. Storage device 201-9 may include a magnetic and/or optical recording medium and its corresponding drive.

Input device 201-2 may include a mechanism that permits an operator to input information to network node 201', such as a keypad, a keyboard, a mouse, a pen, voice recognition and/or biometric mechanisms, etc. Output device 201-4 may include a mechanism that outputs information to the operator, including a display, a printer, a speaker, etc. Communication interface 201-6 may include any transceiver-like mechanism that enables network node 201' to communicate with other devices and/or systems (such as with a PCEF or a PCRF session database). For example, communication interface 201-6 may include mechanisms for communicating with another device or system via a network.

Network node 200' may perform certain operations or processes described herein. These operations may be performed in response to processing unit 201-3 executing software instructions contained in a computer-readable medium, such as main memory 201-7, ROM 201-8, and/or storage device 201-9. A computer-readable medium may be defined as a physical or a logical memory device. For example, a logical memory device may include memory space within a single physical memory device or distributed across multiple physical memory devices. Each of main memory 201-7, ROM 201-8 and storage device 201-9 may include computer-readable media. The magnetic and/or optical recording media (e.g., readable CDs or DVDs) of storage device 201-9 may also include computer-readable media. The software instructions may be read into main memory 201-7 from another computer-readable medium, such as storage device 201-9, or from another device via communication interface 201-6.

The software instructions contained in main memory 201-9 may cause processing unit 201-3 to perform operations or processes described herein, such as those characterizing the PCRF. Alternatively, hardwired circuitry may be used in place of or in combination with software instructions to implement processes and/or operations described herein. Thus, implementations described herein are not limited to any specific combination of hardware and software.

Figure 11:
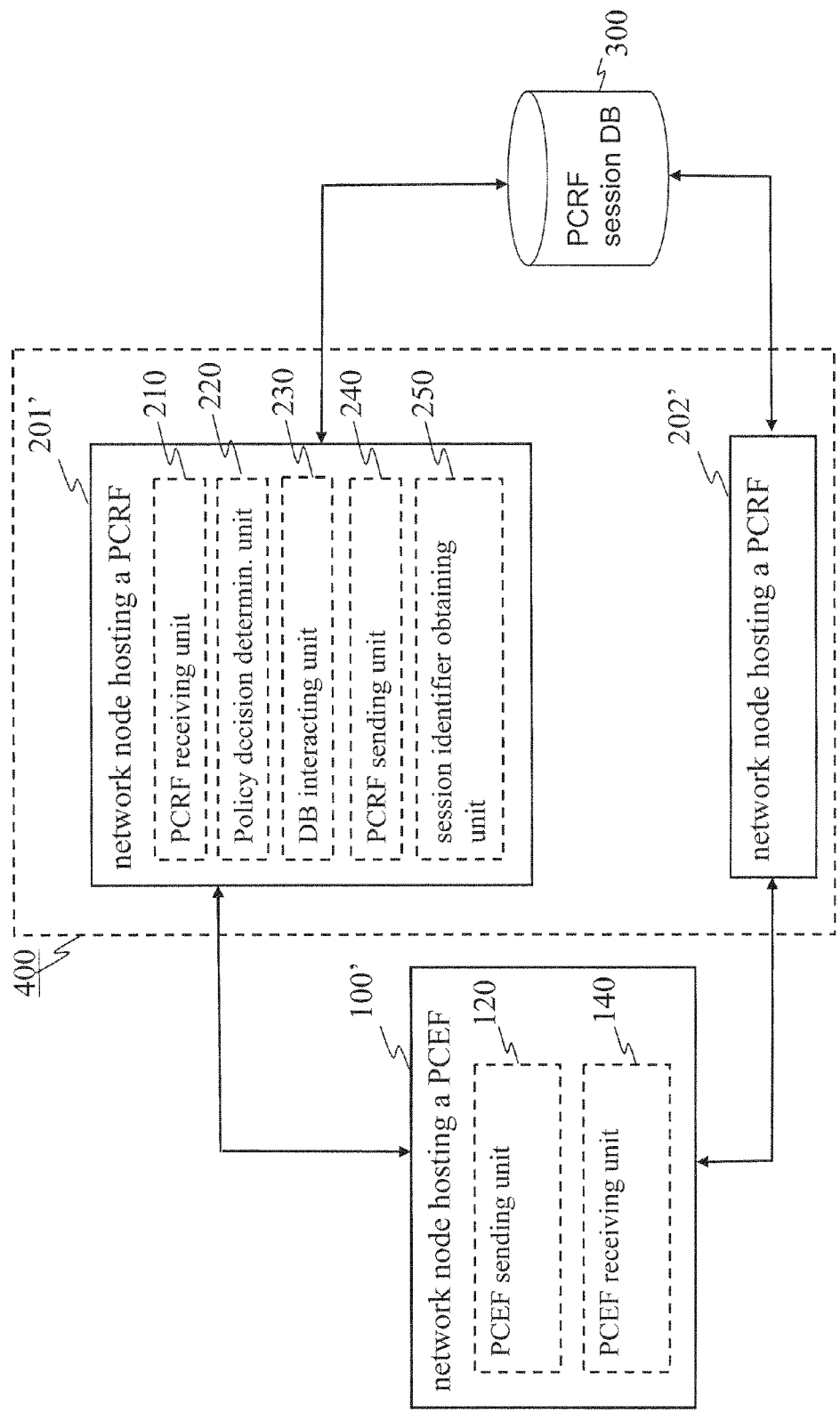
FIG. 11 schematically illustrates a system including two network nodes each hosting a PCRF, in one embodiment of the invention.

FIG. 11 schematically illustrates, as one embodiment of the invention, a system 400 comprising a network node 201' hosting a first PCRF and a network node 202' hosting a second PCRF. Further, a network node 100' hosting a PCEF and a network node 300 hosting a PCRF session DB are also provided. PCRF session database 300 is accessible by both network node 201' and network node 202'. Each of the network nodes illustrated on FIG. 11 may for example be implemented as illustrated on FIG. 10.

Network node 100' hosts a PCEF and may comprise a so-called sending unit 120 and a so-called receiving unit 140. Sending unit 120 may for example be configured for sending, when required, any one of an IP-CAN session establishment indication (together with IP-CAN session data), an IP-CAN session modification indication (together with modified IP-CAN session data), and an IP-CAN session termination indication towards a PCRF (directly or, alternatively, through an intermediate load balancer). Receiving unit 140 may for example be configured to receive PCC rules (or more generally policy decision information) decided by a PCRF. The received PCC rules (such as for example applying a particular QoS) may then be enforced, by the network node 100' hosting the PCEF, on received packets. Other PCRF clients (such as AF, BBERF, OCS, and TDF) may be configured with a similar sending unit and a similar receiving unit for interacting with the PCRF.

Network node 201 hosts a PCRF and may comprise a so-called receiving unit 210, a so-called policy decision determining unit 220, a so-called DB interacting unit 230, a so-called sending unit 240, and a so-called session identifier obtaining unit 250.

Receiving unit 210 is configured to receive any one of an IP-CAN session establishment indication from a PCEF, an IP-CAN session modification indication from a PCEF (or any other PCRF client), and an IP-CAN session termination indication from a PCEF, optionally through an intermediate load balancer located between the PCRF and the PCEF.

Policy decision determining unit 220 is configured to determine PCC rules and/or other policy decision information for a new IP-CAN session or modified PCC rules and/or modified policy decision information for a modified IP-CAN session. The determination may be based on modified IP-CAN session data and session information retrieved from database 300.

DB interacting unit 230 is configured to persist session information in database 300 and to retrieve session information therefrom, when necessary. The session information is stored in database 300, in association with a session identifier. The stored session information comprises, or represents, the IP-CAN session data and PCC rules and/or other policy decision information.

Sending unit 240 is configured to provide to a network node, such as network node 100' (or a node hosting any other PCRF client), PCC rules and/or other policy decision information, once those have been determined by policy decision determining unit 220.

Session identifier obtaining unit 250 is configured to obtain or derive, from an IP-CAN session modification indication or from an IP-CAN session termination indication, the session identifier of the IP-CAN session at stake. Thereafter, the PCRF may then retrieve any session information it needs from database 300 based on the session identifier, so that the PCRF may properly handle a session, even if the session is an on-going session activated by another PCRF.

Network node 202' may be configured in the same manner as network node 201'.

Where the terms "PCEF sending unit", "PCEF receiving unit", "PCRF receiving unit", "policy decision determining unit", "DB interacting unit", "PCRF sending unit", "session identifier obtaining unit", etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned PCEF sending unit, PCEF receiving unit, PCRF receiving unit, policy decision determining unit, DB interacting unit, PCRF sending unit, session identifier obtaining unit, etc. is replaced by PCEF sending means, PCEF receiving means, PCRF receiving means, policy decision determining means, DB interacting means, PCRF sending means, session identifier obtaining means, etc. respectively, for performing the functions of the PCEF sending unit, PCEF receiving unit, PCRF receiving unit, policy decision determining unit, DB interacting unit, PCRF sending unit, session identifier obtaining unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method carried out by at least a first policy and charging rules function, hereinafter abbreviated as "first PCRF", and a second policy and charging rules function, hereinafter abbreviated as "second PCRF", the method comprising:

by the first PCRF:
receiving, from a policy and charging enforcement function, hereinafter abbreviated as "PCEF", a first message indicating an establishment of an Internet Protocol connectivity access network session, hereinafter abbreviated as "IP-CAN session", the first message comprising IP-CAN session data;
determining first policy decision information for the IP-CAN session;
causing a database accessible by the first PCRF and the second PCRF to store, in association with a session identifier, session information comprising, or representing, the IP-CAN session data and the first policy decision information; and
providing, to the PCEF, the first policy decision information;

by the second PCRF:
receiving, from a PCRF client, a second message indicating a modification of the IP-CAN session, the second message comprising modified IP-CAN session data;
obtaining or deriving from the second message the session identifier of the IP-CAN session;
retrieving, from the database, the session information stored in association with the session identifier;
determining second policy decision information for the IP-CAN session based on the modified IP-CAN session data and the retrieved session information;
causing the database to store, in association with the session identifier, session information comprising, or representing, the modified IP-CAN session data and the second policy decision information; and
providing, to at least one of the PCEF and the PCRF client, the second policy decision information.

2. Method of claim 1, wherein the PCRF client is any one of
the PCEF,
a traffic detection function, hereinafter referred to as "TDF",
an online charging system, hereinafter referred to as "OCS",
a bearer binding and event reporting function, hereinafter referred to as "BBERF", and
an application function, hereinafter referred to as "AF".

3. Method of claim 1, wherein
the first policy decision information comprises first policy and charging control rules, hereinafter referred to as "first PCC rules", and
the second policy decision information comprises second policy and charging control rules, hereinafter referred to as "second PCC rules".

4. Method according to claim 1, further comprising:
by the first PCRF or the second PCRF:
receiving, from the PCEF, a third message indicating a termination of the IP-CAN session;
obtaining or deriving from the third message the session identifier of the IP-CAN session; and
terminating the IP-CAN session based on the session information stored, in association with the session identifier, in the database.

5. Method according to claim 1, the method being further carried out by a third policy and charging rules function, hereinafter abbreviated as "third PCRF", the database being also accessible by the third PCRF, and the method further comprising:
by the third PCRF:
receiving, from the PCEF a third message indicating a termination of the IP-CAN session;
obtaining or deriving from the third message the session identifier of the IP-CAN session; and
terminating the IP-CAN session based on the session information stored, in association with the session identifier, in the database.

6. Method according to claim 1, wherein
the first PCRF is hosted on a first network node, the second PCRF is hosted on a second network node, and the database is hosted on a third network node, and
each of the first network node, the second network node and the third network node has its own processing unit, its own volatile memory, its own networking capabilities and its own non-volatile storage.

7. Method according to claim 1, wherein the database is hosted on a network node which also hosts a subscription profile repository.

8. System comprising:
a first network node hosting a first policy and charging rules function, hereinafter abbreviated as "first PCRF", and
a second network node hosting a second policy and charging rules function, hereinafter abbreviated as "second PCRF",
each of the first network node and second network node comprising
a PCRF receiving unit configured for receiving messages,
a policy decision determining unit configured for determining policy decision information,
a database interacting unit configured for interacting with a database,
a PCRF sending unit configured for sending messages; and
a session identifier obtaining unit configured for obtaining a session identifier;
the system being configured so that:
when the first network node's PCRF receiving unit receives, from a network node hosting a policy and charging enforcement function, hereinafter abbreviated as "PCEF", a first message indicating an establishment of an Internet Protocol connectivity access network session, hereinafter abbreviated as "IP-CAN session", the first message comprising IP-CAN session data,
the first network node's policy decision determining unit determines first policy decision information for the IP-CAN session;
the first network node's database interacting unit causes a database, accessible by the first network node and second network node, to store, in association with a session identifier, session information comprising, or representing, the IP-CAN session data and the first policy decision information; and
the first network node's PCRF sending unit provides, to the network node hosting the PCEF, the first policy decision information;
when the second network node's PCRF receiving unit receives, from the network node hosting a PCRF client, a second message indicating a modification of the IP-CAN session, the second message comprising modified IP-CAN session data,
the second network node's session identifier obtaining unit obtains or derives from the second message the session identifier of the IP-CAN session;
the second network node's database interacting unit retrieves, from the database, the session information stored in association with the session identifier;
the second network node's policy decision determining unit determines second policy decision information for the IP-CAN session based on the modified IP-CAN session data and the retrieved session information;
the second network node's database interacting unit causes the database to store, in association with the session identifier, session information comprising, or representing, the modified IP-CAN session data and the second policy decision information; and
the second network node's PCRF sending unit provides, to at least one of the network node hosting the PCEF and the network node hosting the PCRF client, the second policy decision information.

9. System of claim 8, wherein the PCRF client is any one of
the PCEF,
a traffic detection function, hereinafter referred to as "TDF",
an online charging system, hereinafter referred to as "OCS",
a bearer binding and event reporting function, hereinafter referred to as "BBERF", and
an application function, hereinafter referred to as "AF".

10. System of claim 8, wherein
the first policy decision information comprises first policy and charging control rules, hereinafter referred to as "first PCC rules", and
the second policy decision information comprises second policy and charging control rules, hereinafter referred to as "second PCC rules".

11. System according to claim 8, further configured so that:
when the first network node hosting the first PCRF or when the second network node hosting the second PCRF receives, from the network node hosting the PCEF, a third message indicating a termination of the IP-CAN session, the first network node or, respectively, the second network node:
obtains or derives from the third message the session identifier of the IP-CAN session; and
terminates the IP-CAN session based on the session information stored, in association with the session identifier, in the database.

12. System according to claim 8, further comprising:
a third network node hosting a third policy and charging rules function, hereinafter abbreviated as "third PCRF", the database being also accessible by the third PCRF,
the system being further configured so that:
when the third network node receives, from the network node hosting the PCEF, a third message indicating a termination of the IP-CAN session, the third network node
obtains or derives from the third message the session identifier of the IP-CAN session; and
terminates the IP-CAN session based on the session information stored, in association with the session identifier, in the database.

13. System according to claim 8, wherein each of the first network node, the second network node, and the network node hosting the database has its own processing unit, its own volatile memory, its own networking capabilities and its own non-volatile storage.

14. System according to claim 8, wherein the database is hosted on a network node which also hosts a subscription profile repository.

\* \* \* \* \*